(12) United States Patent
Olsen et al.

(10) Patent No.: US 12,045,311 B2
(45) Date of Patent: Jul. 23, 2024

(54) SUPER RESOLUTION FOR SATELLITE IMAGES

(71) Applicant: Microsoft Technology Licensing, LLC, Redmond, WA (US)

(72) Inventors: Peder A. Olsen, Redmond, WA (US); Ranveer Chandra, Kirkland, WA (US); Olaoluwa Adigun, Los Angeles, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 459 days.

(21) Appl. No.: 17/211,330

(22) Filed: Mar. 24, 2021

(65) Prior Publication Data
US 2024/0211540 A1 Jun. 27, 2024

(51) Int. Cl.
*G06F 18/214* (2023.01)
*G06T 3/4053* (2024.01)
*G06T 3/4076* (2024.01)

(52) U.S. Cl.
CPC .......... *G06F 18/214* (2023.01); *G06T 3/4053* (2013.01); *G06T 3/4076* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | |
|---|---|---|
| 9,875,428 B2 | 1/2018 | Ramamurthy et al. |
| 10,878,588 B2 | 12/2020 | Yang et al. |
| 2009/0232349 A1 | 9/2009 | Moses et al. |
| 2016/0012314 A1 | 1/2016 | Ramamurthy et al. |
| 2019/0297326 A1 | 9/2019 | Reda et al. |

(Continued)

OTHER PUBLICATIONS

2. Luo et al ("Video Satellite Imagery Super Resolution via Convolutional Neural Networks", In IEEE Geoscience and Remote Sensing Letters, vol. 14 Issue 12, Published Nov. 9, 2017, DOI: 10.1109/LGRS.2017.2766204, pp. 2398-2402) (Year: 2017).*

(Continued)

*Primary Examiner* — Leon Viet Q Nguyen
(74) *Attorney, Agent, or Firm* — Newport IP, LLC; Jacob P. Rohwer

(57) ABSTRACT

Systems and methods for generating predicted high-resolution images from low-resolution images. To generate the predicted high-resolution images, the present technology may utilize machine learning models and super resolution models in a series of processes. For instance, the low-resolution images may undergo a sensor transformation based on processing by a machine learning model. The low-resolution images may also be combined with land structure features and/or prior high-resolution images to form an augmented input that is processed by a super resolution model to generate an initial predicted high-resolution image. The predicted initial high-resolution image may be combined or stacked with other predicted high-resolution images to form a stacked image. That stacked image may then be processed by another super resolution model to generate a final predicted high-resolution image.

20 Claims, 15 Drawing Sheets

(56) References Cited

U.S. PATENT DOCUMENTS

| | | |
|---|---|---|
| 2019/0392596 A1 | 12/2019 | Yang et al. |
| 2020/0103909 A1* | 4/2020 | Feinson ............... G06V 20/58 |
| 2020/0143519 A1 | 5/2020 | Gordon et al. |
| 2020/0364830 A1* | 11/2020 | Manimaran ............ G06T 5/009 |
| 2021/0097311 A1 | 4/2021 | Mcbeth et al. |
| 2021/0133936 A1 | 5/2021 | Chandra et al. |

OTHER PUBLICATIONS

Song et al ("Spatiotemporal Satellite Image Fusion Using Deep Convolutional Neural Networks", In Journal of Selected Topics in Applied Earth Observations and Remote Sensing, vol. 11, Issue 3, Mar. 1, 2018, pp. 821-829) (Year: 2018).*

Liu, et al., "StfNet: A Two-Stream Convolutional Neural Network for Spatiotemporal Image Fusion", In Journal of Transactions on Geoscience and Remote Sensing, vol. 57, Issue 9, Sep. 1, 2019, pp. 6552-6564.

"International Search Report & Written Opinion issued in PCT Application No. PCT/US22/020098", Mailed Date: Sep. 8, 2022, 20 Pages.

"Invitation To Pay Additional Fee Issued In PCT Application No. PCT/US22/020098", Mailed Date: Jul. 18, 2022, 13 Pages.

Song, et al., "Spatiotemporal Satellite Image Fusion Using Deep Convolutional Neural Networks", In Journal of Selected Topics in Applied Earth Observations and Remote Sensing, vol. 11, Issue 3, Mar. 1, 2018, pp. 821-829.

Zhang, et al., "Remote Sensing Image Spatiotemporal Fusion Using a Generative Adversarial Network", In Journal of Transactions on Geoscience and Remote Sensing, vol. 59, Issue 5, May 2021, pp. 4273-4286.

Wang, X. et al. (2019). ESRGAN: Enhanced Super-Resolution Generative Adversarial Networks. In: Leal-Taixé, L., Roth, S. (eds) Computer Vision—ECCV 2018 Workshops. ECCV 2018. Lecture Notes in Computer Science(), vol. 11133. Springer, Cham. https://doi.org/10.1007/978-3-030-11021_5, 23 pages.

"Non Final Office Action Issued in U.S. Appl. No. 16/786,257", Mailed Date: May 16, 2022, 12 Pages.

Bermudez, "SAR to Optical Image Synthesis for Cloud Removal with Generative Adversarial Networks", In Proceedings of ISPRS Annals of the Photogrammetry, Remote Sensing and Spatial Information Sciences, vol. IV-1, Oct. 10, 2018, pp. 5-11.

Li, et al., "Semantic-aware Grad-GAN for Virtual-to-Real Urban Scene Adaption", In repository of arxiv code:1801.01726v2 [cs.CV], Jul. 14, 2018, 10 Pages.

Shin, et al., "Medical Image Synthesis for Data Augmentation and Anonymization using Generative Adversarial Networks", In repository of arXiv:1807.10225v2 [cs.CV], Sep. 13, 2018, 11 Pages.

"Notice of Allowance Issued in U.S. Appl. No. 16/786,257", Mailed Date: Nov. 25, 2022, 9 Pages.

"Non Final Office Action Issued in U.S. Appl. No. 16/786,257", Mailed Date: Sep. 21, 2021, 13 Pages.

Wang, et al., "ESRGAN: Enhanced Super-Resolution Generative Adversarial Networks", In Proceedings of the European Conference on Computer Vision Workshops, Sep. 8, 2018, 16 Pages.

"Final Office Action Issued in U.S. Appl. No. 16/786,257", Mailed Date: Jan. 21, 2022, 8 Pages.

Grohnfeldi, et al., "A Conditional Generative Adversarial Network to Fuse Sar And Multi spectral Optical Data for Cloud Removal from Sentinel-2 Images", In IEEE International Geoscience and Remote Sensing Symposium, Jul. 22, 2018, pp. 1726-1729.

Isola, et al., "Image-to-Image Translation with Conditional Adversarial Networks", In Repository of arXiv:1611.07004v2, Nov. 22, 2017, 17 Pages.

Enomoto, et al., "Filmy Cloud Removal on Satellite Imagery with Multispectral Conditional Generative Adversarial Nets", In Repository of arXiv:1710.04835v1, Oct. 13, 2017, 9 Pages.

"International Search Report and Written Opinion Issued in PCT Application No. PCT/US20/056216", Mailed Date : Jan. 18, 2021, 11 Pages.

Yu, et al., "Free-Form Image Inpainting with Gated Convolution", In Repository of arXiv:1806.03589v2, Oct. 22, 2019, 17 Pages.

Yu, et al., "Generative Image Inpainting with Contextual Attention", In Repository of arXiv:1801.07892v2, Mar. 21, 2018, 15 Pages.

U.S. Appl. No. 16/786,257, filed Feb. 10, 2020.

* cited by examiner

SUPER RESOLUTION FOR SATELLITE IMAGES

BACKGROUND

Images having various different resolutions may be generated from devices capturing various spectrums of electromagnetic radiation. For example, satellite images may be generated at different resolutions and for different spectrums. The resolution of the images and the spectrum may vary based on the type of satellite. In addition, each of the satellites may capture images of particular locations at different time intervals.

SUMMARY

Aspects of the present technology relate to systems and methods that may generate predicted high-resolution images from low-resolution images. Low-resolution images may be captured more frequently than high-resolution images. For example, with satellite imagery, high-resolution images of a geographic location may be captured roughly every 100 days, whereas low-resolution images of the geographic location may be captured every few days. Accordingly, when a new low-resolution image is captured on a particular date, the present technology generates a predicted high-resolution image for that particular date. Thus, an actual high-resolution image does not need to be captured by an imaging device for that particular date.

To generate the predicted high-resolution images, the present technology may utilize machine learning models and super resolution models in a series of processes. For instance, the low-resolution images may undergo a sensor transformation based on processing by a machine learning model. The low-resolution images may also be combined with land structure features and/or prior high-resolution images to form an augmented input that is processed by a super resolution model to generate an initial predicted high-resolution image. The predicted initial high-resolution image may be combined or stacked with other predicted high-resolution images to form a stacked image. That stacked image may then be processed by another super resolution model to generate a final predicted high-resolution image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
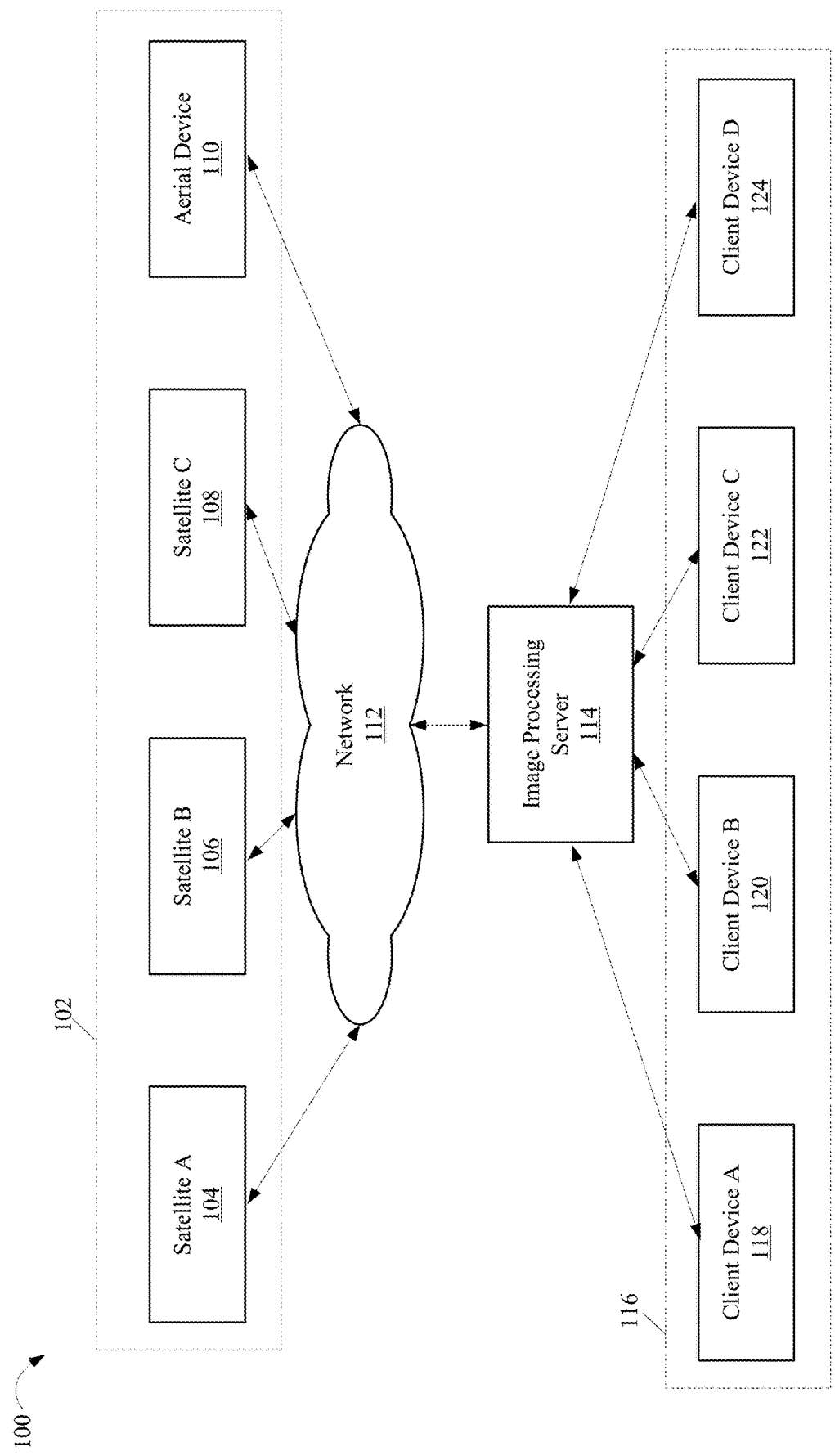
FIG. 1 illustrates an overview of an example system for performing super resolution (SR) processes for satellite images.

As briefly discussed above, satellites may capture various types of images at different time intervals. Currently, earth observation satellites travel around the Earth and continuously collect images of the planet via various imaging techniques, including optical and radar. Satellite imagery has many applications, such as in agriculture, environmental monitoring, and mapping. Organizations such as the National Aeronautics and Space Administration (NASA) and the European Space Agency (ESA) provide public access to satellite data. One challenge in satellite mapping of the Earth using optical or multispectral satellite data is that much of the view of the Earth's surface is frequently obscured by clouds, which results in occluded images. Further, even when not completely occluded, thin clouds, haze, and cloud shadows may produce pixel noise and corrupt the images. As a result, for a given geographic area, relatively few cloud-free optical or multispectral satellite images may be obtained for a geographic area over a period of time, which limits the potential uses of such satellite imagery.

The use of satellite imagery is also dependent on the resolution of the images acquired by the satellites. For instance, high-resolution images are generally more useful than low-resolution images. The high-resolution images, however, are captured less frequently than the low-resolution images. Thus, when a high-resolution image of a particular location is occluded, such as by clouds, a substantial amount of time may pass before another high-resolution image is captured of that location. High-resolution images are also more costly to obtain due to the increased technological requirements for capturing a high-resolution image from a satellite. On the other hand, low-resolution images are less costly and are captured more frequently, which increases the likelihood that an unoccluded low-resolution image may be captured. But, the low-resolution images are generally less useful. In addition, radar data or radar images may also be captured by satellites. Unlike optical image data and multispectral image data, radar data can penetrate clouds, and can be obtained at night. However, radar data may be more difficult to visualize and interpret than optical image data or multispectral data.

To help alleviate the foregoing issues, among others, the present technology provides for using low-resolution images of a particular location to generate a predicted high-resolution image for that particular location on date when the low-resolution images were captured. In other examples, high-resolution images may be generated on days with no low-resolution images, such as by using synthetic apertured radar data or interpolation from other available data. Thus, the more-frequently captured low-resolution images may be utilized to generate the more-useful high-resolution images without requiring a current or live high-resolution image from a satellite. The present technology is able to fuse and process the low-resolution images to produce high-resolution images, even where different image spectrums are involved and the images are captured on different days. For instance, the examples discussed herein may utilize satellite images (optical and/or multispectral) as well as radar data (e.g., synthetic-aperture radar (SAR) data) to generate high-resolution images. Ultimately, the technology is able to produce highly accurate predictions of high-resolution images that may be used in many more applications than the low-resolution images due to the increased resolution of the images.

FIG. 1 illustrates an overview of an example system 100 for performing super resolution (SR) processes for satellite images. The system 100 includes a plurality of image acquisition devices 102. The image acquisition devices 102 may include a plurality of satellites, such as satellite A 104, satellite B 106, and satellite C 108. The image acquisition devices 102 may also include other types of imaging devices, such as one or more aerial devices 110. The aerial devices 110 may include airplane, drone, unmanned aerial vehicles (UAVs), or similar aerial devices that are capable of capturing images. Each of the image acquisition devices 102 may capture images at different spectrums and/or at different time intervals or frequencies. For instance, the image acquisition devices 102 may have different sensors that capture different spectrums or bands of electromagnetic radiation.

As an example, satellite A 104 may be a Sentinel-1 satellite system, satellite B 106 may be Sentinel-2 satellite system, and satellite C 106 may be an Airbus Pleiades satellite system. Table 1 below shows various characteristics of such example satellite systems:

TABLE 1

| System | Sensor | Spatial Resolution | Frequency/Interval |
| --- | --- | --- | --- |
| Sentinel-1 | Radar (SAR) | 5 m × 20 m | 1-12 days |
| Sentinel-2 | Multi-Spectral | 10 m × 10 m | 2-5 days |
| Airbus Pléiades | Multi-Spectral | 2 m × 2 m | >100 days |

Table 1 indicates that the Sentinel-1 system generates radar data or images of relatively low resolution but at a potentially high frequency. The Sentinel-2 system generates multi-spectral data or images also at a relatively low resolution but at a relatively high frequency. The multi-spectral data may include many different spectrums, including more traditional red-green-blue (RGB) among other optical bands such as infrared (IR), near infrared (NIR), short-wave infrared (SWIR), and Red Edge, among others. The Airbus system also generates multi-spectral data or images. However, in contrast to the Sentinel-2 system, the Airbus Pleiades system generates high-resolution data infrequently. While the example satellite systems (e.g., Sentinel-1, Sentinel-2, Airbus Pleiades) are described above, it should be understood that the system 100 is not limited to using those specific satellites. Rather, those specific satellite systems are merely provided as illustrative examples. The distinguishing features between the satellite systems, or the images or data produced therefrom, may include the sensor or spectrum, the spatial resolution, and the frequency of capture for a particular location.

The image data generated from the image acquisition devices 102 is transmitted through a network 112 to an image processing server 114. The network 112 may include various networking hardware, such as routers, switches, etc. The network 112 may also include databases for storing the data or images from the image acquisition devices 102. For instance, each satellite system may have its own storage facilities for storing the respective images or data. The image data may then be transmitted from those databases or data stores to the image processing server 114. From the perspective of the image processing server 114, the image processing server 114 receives or accesses the image data via the network 112. Once the satellite image data has been received by the image processing server 114, the image data may be stored by the image processing server 114 for processing or later use. For instance, the image processing server 114 may access the stored image data to perform the methods and processes described herein.

The image processing server 114 may be a standalone computing device or a plurality of computing devices, including processors, memories, and other computing elements. The image processing server 114 may also be part of a cloud-computing infrastructure, such as the AZURE cloud computing service from the Microsoft Corporation of Redmond, Washington.

The image processing server 114 may be in communication with a plurality of client devices 116, which may include client device A 118, client device B 120, client device C 122, and client device D 124. While only four client devices 116 are depicted in FIG. 1, it should be appreciated that more or fewer client devices may be in communication with the image processing server 114. When the image processing server 114 processes the images and/or data received from the image acquisition devices 102 to generate a predicted high-resolution image, that predicted high-resolution image may then be communication from the image processing server 114 to one or more of the client devices 116. From the perspective of the client devices 116, the client devices 116 access or receive the predicted high-resolution images from the image processing server 114. The client devices 116 may access the predicted high-resolution images through an application programming interface (API), a web-based interface, and/or through an application installed on the client devices 116, among other ways of access. In some examples where the image processing server 114 is part of a cloud-computing infrastructure, the client devices 116 may be considered tenants of the cloud-computing infrastructure. One or more of the client devices 116 may also process or use the predicted high-resolution images for further processing, such as to provide services or products to clients or customers of the company operating one or more of the client devices 116.

Figure 2:
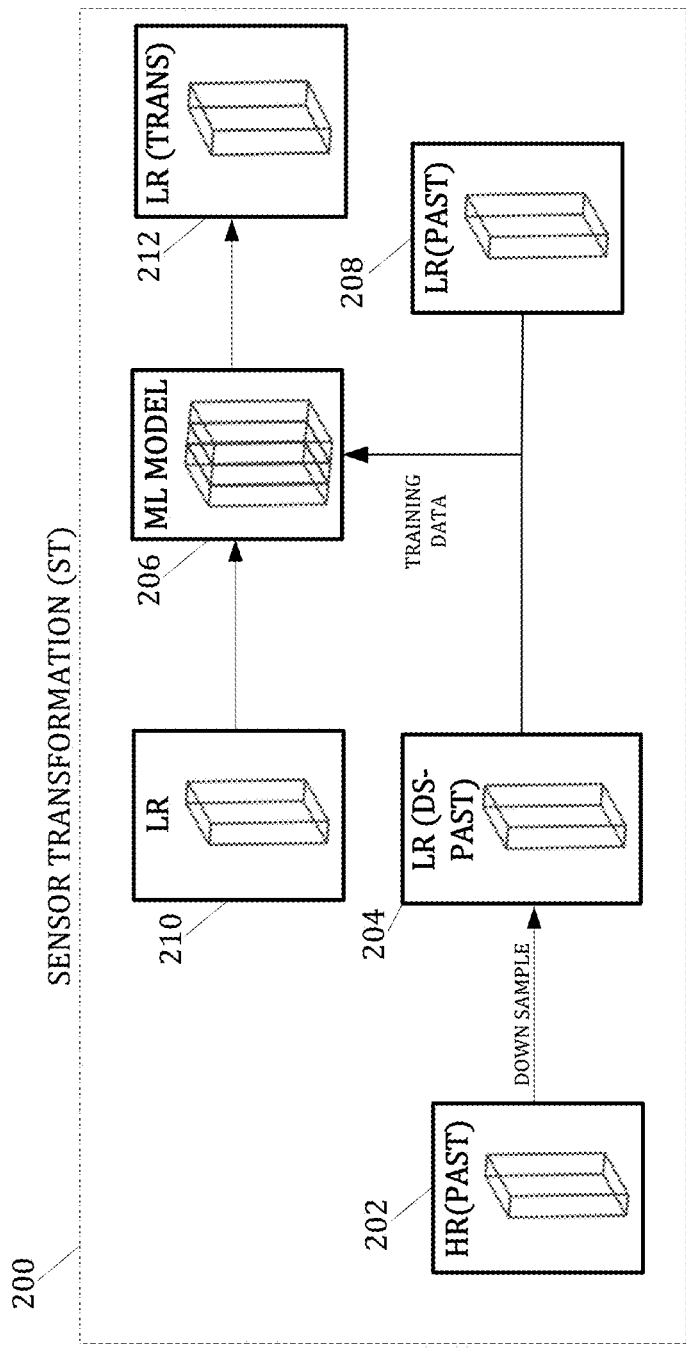
FIG. 2 depicts a block diagram for an example sensor transformation (ST) process.

FIG. 2 depicts a block diagram for an example sensor transformation (ST) process 200. The ST process allows for mapping images having different spectrums. For example, in performing processes on traditional photos, there is often no mismatch between spectrums or channels of the images. That is, photos are often provided in RGB format and little to no conversion is required to compare or process two photos together. With satellite imagery, however, multiple spectrums and channels may be used to capture the data and images. For example, with Sentinel-2 has sensors that capture images in SWIR, vegetation red edge and narrow near infrared (NNIR) spectrums that are not provided in the Airbus Pleiades satellite system. In addition, the RGB sensors of one satellite may have different spectral bandwidths than the RGB sensors of another satellite. As an example, the sensor that measures green has central wavelength of 600 nm with a bandwidth of 36 nm for Sentinel-2 while it has a central wavelength of 560 nm with a bandwidth of 60 nm for the Airbus Pleiades satellite. In some examples, one satellite system may use an RGB sensor that produces RGB channels in an image, and another satellite system may use a panchromatic sensor spanning the RGB spectrum that produces data for a single channel of an image. The different spectrums or channels of the images that result from different sensors of the image capture devices may be referred to as sensor characteristics of the images. Accordingly, there is a need to map the image data having sensor characteristics from image source (e.g., satellite A) to the image data having different sensor characteristics from another image source (e.g., satellite B). The ST process 200 is able to perform that function.

The ST process 200 utilizes a trained machine learning model 206 to perform the transformation or mapping of spectrum type to another. The trained machine learning model 206 may be an appropriate type of machine learning model for processing images, such as a neural network. The machine learning model 206 may be trained based on prior low-resolution images and prior high-resolution images. A prior high-resolution image 202 that was captured on a particular date may be acquired or accessed. The prior high-resolution image has particular sensor characteristics. For example, that high-resolution image 202 may be an image from the Airbus Pleiades satellite system. The high-resolution image 202 may be down sampled to generate a prior down-sampled low-resolution image 204 having the particular sensor characteristics. The high-resolution image 202 is down sampled to match or substantially match the resolution of low-resolution images that are to be used with the machine learning model 206 at runtime. For example, the resolution of the low-resolution image may be that of the Sentinel-2 satellite system.

The prior down-sampled low-resolution image 204 is used as the ground truth or desired output for training the machine learning model 206, and the training input is the previously acquired low-resolution image 208. For instance, the prior low-resolution image 208 may be an image acquired from the Sentinel-2 satellite system. The prior low-resolution image 208 may have different sensor characteristics than the sensor characteristics of the down sampled low-resolution image 204. The low-resolution image 208 may have been acquired on substantially same date as the prior high-resolution image 202. Thus, for training the machine learning model 206, the input is a prior low-resolution image 208 from a first imaging device, and the ground truth or desired output is a down sampled low-resolution image 204 that was the result of down sampling a high-resolution image 202 from a second imaging device. Many of these training input and output pairs may be generated for multiple physical locations and dates, and supervised training of the machine learning model 206 may be accomplished with those training pairs.

Once the machine learning model 206 is trained, new low-resolution images or data 210 may be provided as input to the machine learning model 206. The output of the machine learning model 206 is a transformed low-resolution image 212. The transformed low-resolution image 212 may have image properties and/or sensor characteristics that are more aligned with the image properties and/or sensor characteristics of the high-resolution image 202. For instance, the transformed low-resolution image 212 may have the same color channels as the high-resolution image 202. Accordingly, the transformed low-resolution image 212 may be used in additional processing to predict a high-resolution image sharing similar spectrum properties or sensor characteristics as the high-resolution image 202, as discussed further below.

Figure 3:
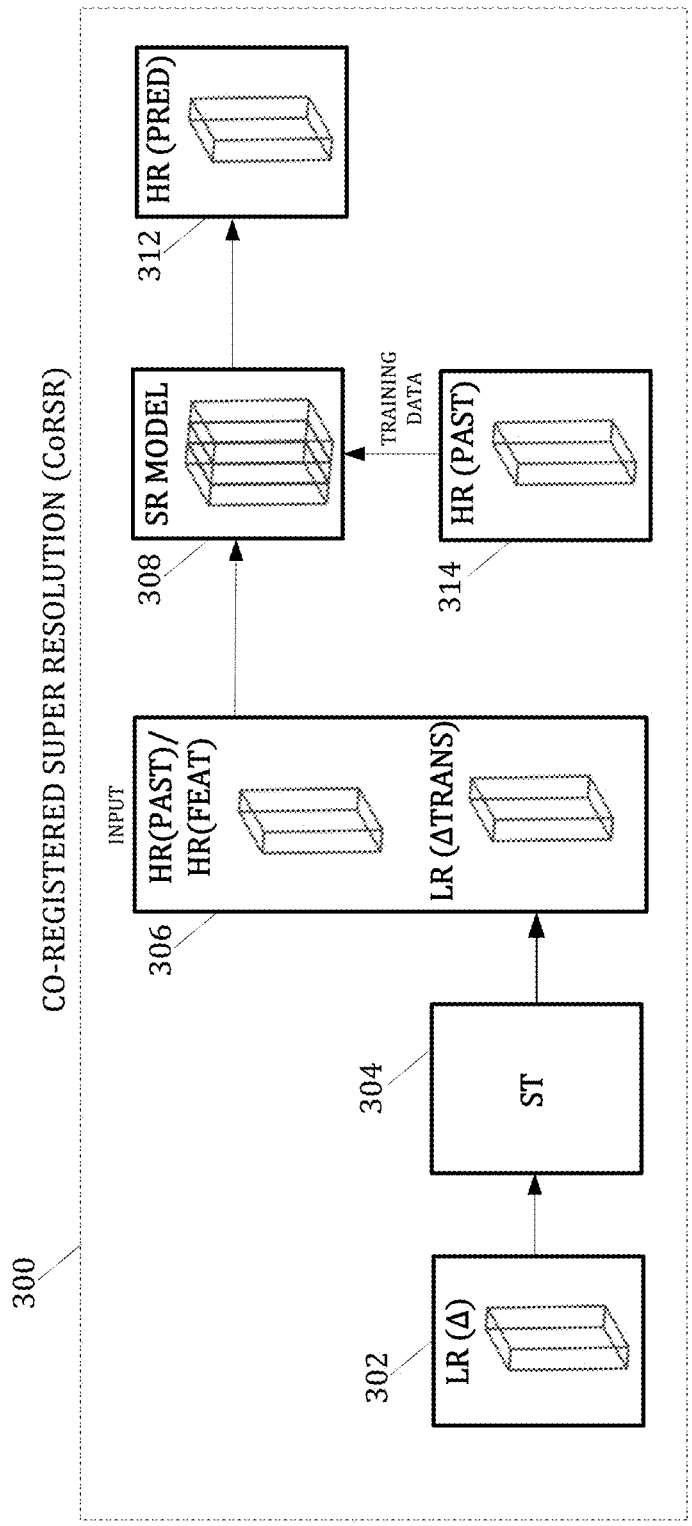
FIG. 3 depicts a block diagram for an example co-registered super resolution (CoRSR) process.

FIG. 3 depicts a block diagram for an example co-registered super resolution (CoRSR) process 300. In general, a super resolution process includes increasing the resolution of a low-resolution image to the resolution of high-resolution image using machine learning models, such as neural networks. One example of a machine learning model for performing super resolution is a super resolution convolutional neural network (SRCNN), which is a three-layer CNN that increases the resolution of images. Other examples of SR techniques or models include a Residual-in-Residual Dense Block (RRDB) technique, a Super-Resolution Generative Adversarial Network (SRGAN), and an Enhanced SRGAN (ESRGAN), among others.

To perform the CoRSR process 300, a low-resolution image 302 may be accessed. The low-resolution image 302 may be a recent Sentinel-2 image. The low-resolution image 302 may be a low-resolution delta image that is an image that represents a difference between a current low-resolution image and a low-resolution image captured on the same or similar date as a prior high-resolution image. For example, a new low-resolution image of a particular geographic image may be captured on Mar. 1, 2021. The most-recent high-resolution image for that particular geographic location may have been captured on Jul. 1, 2020. The low-resolution delta image 302 would then be a difference between the low-resolution image captured on Mar. 1, 2021, and a low-resolution image captured on or near Jul. 1, 2020. The low-resolution delta image may be formed by subtracting the prior low-resolution image from the current high-resolution data.

An ST process 304 is performed on the low-resolution delta image 302 to generate a transformed low-resolution delta image (LR (ATRANS)). The transformed low-resolution delta image is combined with one or more past high-resolution images (HR(PAST)) and/or land structure features (HR(FEAT)) to form an augmented input 306 for an SR model 308. The transformed low-resolution delta image (LR (ATRANS)) may be upsampled to match the resolution of the past high-resolution image (HR(PAST)) and/or the land structure features (HR(FEAT)). By upsampling the transformed low-resolution delta image (LR (ATRANS)), it can be more easily combined with the one or more past high-resolution images (HR(PAST)) and/or land structure features (HR(FEAT)) to form the augmented input 306. The augmented input 306 may be formed as a multi-channel image representing the combination of the transformed low-resolution delta image, the past high-resolution image, and/or the land-structure features.

The SR model 308 may include any of the SR models or techniques described in the preceding paragraph, such as SRCNN, RRDB, SRGAN, and ESRGAN, among others. The output of the SR model 308 is a predicted high-resolution image corresponding to the physical location captured in the low-resolution image 302 on the date the current low-resolution image 302 was captured. Accordingly, a predicted high-resolution image 312 is generated from the current low-resolution image 302.

The past high-resolution image (HR(PAST)) may be a high-resolution image that was acquired or captured prior to the capture of the low-resolution image 302. For example, the past high-resolution image may be the most-recent high-resolution image available for the particular geographic location captured in the low-resolution image 302. The land structure features (HR(FEAT)) may include additional data about more permanent features of the land that is captured in the images. Land structure features may include features such a rivers, lakes, roads, permanent structures, among other types of features that do not frequently change. In some examples, the land structure feature information may come from maps or map applications that show the location of such types of land structure features. For example, mapping applications include data regarding the location of such permanent structures (e.g., roads, rivers, etc.). The term external land data may be used to describe land data that comes from sources other than the low-resolution image or the high-resolution images utilized in the primary processes. For instance, the external land data may include an elevation or topographic map or another remotely sensed high resolution image (e.g., generated from aerial devices, a third satellite system, a UAV, etc.) The land structure features may also come from other images or data, such as radar data which may be available from the Sentinel-1 satellite system. Other types of high-resolution predictions or high-resolution images for other spectral bands may be utilized. The land structure feature data may also be extracted from a high-resolution image and/or a series of a high-resolution images. Processes for extracting such land structure features are discussed below in further detail with respect to FIGS. 4A-B.

Training the SR model 308 may be based on the same type of augmented input 306 discussed above for low-resolution image data corresponding to prior dates where past high-resolution images 314 are available. For instance, a past high-resolution image 314 acquired on a particular date may be used as the ground truth or desired output for the SR model 308. The training input includes a transformed low-resolution image or low-resolution delta image based on a low-resolution image acquired on substantially the same date as the high-resolution image 314. The transformed low-resolution image or delta image is combined with the land structure features or other past high-resolution images to form the training augmented input 306. Such training pairs of input and desired outputs may be generated for as many prior high-resolution images as desired or available. Accordingly, supervised training of the SR model 308 may be performed on the training input and output pairs.

Figure 4A:
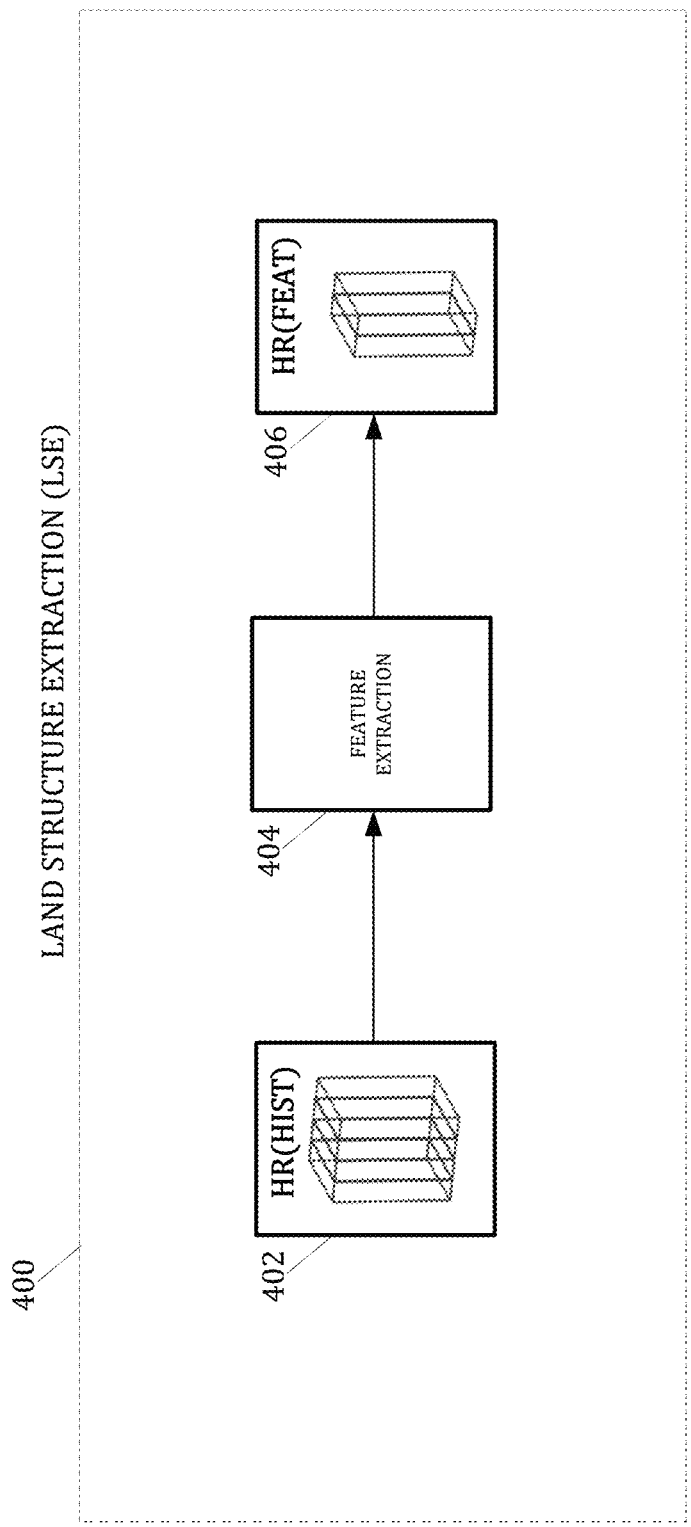
FIG. 4A depicts a block diagram for an example land structure extraction (LSE) process.

FIG. 4A depicts a block diagram for an example land structure extraction (LSE) process 400. The LSE process 400 is performed to extract land structure feature data from high-resolution images. The land structure feature data may be the land structure feature data used as part of the augmented input 306 in the CoRSR process 300 discussed above with respect to FIG. 3.

The LSE process includes accessing or receiving a plurality of historical high-resolution images 402 for a physical location. For instance, the historical high-resolution images 402 may include a plurality of Airbus Pleiades images of a physical location, and in some examples the historical high-resolution images (HR(HIST)) 402 may have been acquired over a series of months or years. A feature extraction algorithm 404 is then applied to the historical high-resolution images 402. Execution of the feature extraction algorithm 404 results in high-resolution land structure features (HR(FEAT)) 406 for the physical location in the historical high-resolution images 402. Thus, high fidelity features can be extracted from many historical high-resolution multi-spectral images. The high-resolution land structure features may be the type of land structure features discussed above. Those extracted features may then be used in other super resolution algorithms, such as the CoRSR process discussed above and the LASR process discussed below.

One example feature extraction algorithm 404 that may be used as part of the LSE process 400 is a low-rank decomposition algorithm. The low-rank decomposition algorithm allows for an image to be described, in some cases, with less than a dozen parameters. The time series of high-resolution images may be represented as a matrix (X) or four-dimensional tensor, with dimensions of time, spectrum, pixel x-location, and pixel y-location. The matrix (X) may represent the pixel location (e.g., x-y location) in a first dimension and the time and spectrum data in a second dimension. For the spectrum dimension, there may be multiple associated values. For instance, Sentinel-2 data may include thirteen spectral dimensions, red, green, blue, near infrared, four red edge bands, two short wave infrared bands, and three atmospheric bands. Not all of the bands may be utilized, such as the atmospheric bands.

The matrix (X) may be decomposed into the following low-rank matrix $X=UV^T$. The tensor V is representative of the land structure, and the tensor U is representative of the land evolution. For instance, the tensor V represents the pixel location in the image, and the tensor U represents the spectral and time information. As a first step, if clouds are occluding the image, the clouds may effectively be removed using matrix completion techniques. By using the matrix completion techniques, a high-resolution image may be generated effectively without clouds.

The following discussion provides an example algorithm for using such matrix completion techniques. A satellite image sequence may be reshaped into a matrix Y of size $N_c N_t \times N_h N_w$, where $N_c$ is the number of spectral channels, $N_t$ the number of time points and $N_h \times N_w$ is the size of each image. Let M represent a mask, where $M_{ij}=1$ only if the corresponding pixel is available and cloud-free. Consider the objective $$F(X) = \|M \circ (X - Y)\|_F^2 + \alpha \sum_{t=1}^{T-1} \|X_{t+1} - X_t\|_F^2,$$

where $X \in \mathbb{R}^{N_c N_t \times N_h N_w}$ is the cloud-free reconstruction, ° is the element-wise product, and α is the damping coefficient. The optimization $\min_{rank(X) \leq N_r} F(X)$ yields a low-rank solution $X=UV^T$, $U \in \mathbb{R}^{N_c N_t \times N_r}$, $V \in \mathbb{R}^{N_h N_w \times N_r}$ and is a matrix completion method with a temporal smoothness penalty. One can think of V as representing the most important land structures and U as representing the land evolution (i.e. the spectral time series for each land type). An iterative solver algorithm is provided below and may be referred to as an example cloud completion algorithm. The example algorithm may be represented as follows:

Input: Satellite data: Y, cloud free mask: M, rank Nr, damping coefficient α
Output: Cloud-free data: $X=UV^T$, $U \in \mathbb{R}^{N_c N_t \times N_r}$, $V \in \mathbb{R}^{N_c N_t \times N_r}$
(1) $D \in \mathbb{R}^{N_t \times N_t} \leftarrow 0$
(2) $D_{ii} \leftarrow -1$, $D_{i,i+1} \leftarrow 1$, $\forall_i \in \{1, \ldots, N_t-1\}$
(3) $Z \in \mathbb{R}^{N_c N_t \times N_h N_w} \leftarrow 0$, $\Delta = D \otimes I_{N_c}$
(4) for iter←1 to 300 do
(5) $Y_Z \leftarrow ((M \circ Y) - (1-M) \circ Z)$
(6) $U \leftarrow (I + \alpha \Delta^T \Delta)^{-1} Y_Z V (V^T V)^{-1}$
(7) $V \leftarrow Y_Z^T U (UU^T + \alpha U^T \Delta^T \Delta U)^{-31}$ (8) $Z \leftarrow (1-M) \circ (UV^T)$ (9) $X \leftarrow UV^T$ The algorithm may be implemented on a GPU to increase speed. The cloud completion may be used on the low-resolution image data to create cloud-free low-resolution images and also on the high-resolution imagery to extract the high-resolution land structure V. As one example implementation, for a low-resolution reconstruction, 13 spectral bands from Sentinel-2 along with the 2 polarisation bands (VV+VH) from the Sentinel-1 radar images (resampled to 10 m×10 m resolution) may be used to form Y. Clouds or occlusions may also be removed using techniques such as those described in U.S. patent application Ser. No. 16/786,257, titled "Recovering Occluded Image Data Using Machine Learning" and filed on Feb. 10, 2020, which is incorporated herein by reference in its entirety.

A singular value decomposition or factorization may be performed on matrix or the tensor U to extract the land structure features. The top value singular vector may be the most useful, but multiple levels of singular vectors may be utilized. Using the top singular vectors as the land structure features has an advantage in that the top singular vectors are based on several prior high-resolution images, but the use of the top singular vectors allows for the use of same number of bands or channels as a single high-resolution image.

The LSE process may also be used to generate a predicted high-resolution image based on a transformed low-resolution image. Given the right singular vector matrix U of the matrix X, a prediction of the image may be generated using the last row(s) of the left singular vector matrix V. The tensor V can be learning by projecting an upsampled transformed low-resolution image $(X_t)$ onto U. With that updated tensor V, the matrix $X=UVW^T$ is then a super-resolution prediction of the high-resolution image. That super-resolution prediction may be used as part of the augmented input 306.

For example, given the static high-resolution land structure V and the evolutionary state $U_{t+1} \in \mathbb{R}^{N_c \times N_r}$, the cloud-free prediction of the high-resolution image $H_{t+1}$ is given by $U_{t+1}V^T$. While direct access to $U_{t+1}$ is not available, it consists of only a few parameters (for Pléiades $N_c=4$, $N_r \in \{2,3,4,51\}$). These can be estimated by assuming $H_{t+1} \approx T_{t+1} \uparrow$ (the bilinear upsampled $T_{t+1}$, where $T_t$ is a sensor transformed low-resolution image) and reshaping $T_{t+1}\uparrow$ into a matrix $X_{t+1} \in \mathbb{R}^{C \times HW}$. $X_{t+1}$ projected back into the land structure subspace spanned by V gives $U_{t+1}=X_{t+1}V(V^TV)^{-1}$. $H_{t+1}$ can then be estimated by reshaping the $U_{t+1}V^T$ matrix. That high-resolution estimate may be referred to as $H_{V t+1}$. A prior high-resolution image $(H_t)$, the high-resolution estimate $(H_{V t+1})$, and/or $V_r$ where $V_r$ consists of the top r singular vectors (reshaped to an r channel image, referred to herein as singular-vector images) may be used as high-resolution features as part of the augmented input 306 in the CoRSR process.

As another example, generating the predicted high-resolution image from the matrix (X) may be based on the following equation:

$$G(X) = \frac{1}{2}\|UV^T - Y\|_F^2$$

A cloud-free or cloud-free estimate of the up-sampled transformed low-resolution image may be represented as Y in the above equation. The tensor V is known from the low rank decomposition of matrix X. Accordingly, a tensor U for the time that the upsampled transformed low-resolution image may then be determined. Based on the determined U and V, the super-resolution prediction of the high-resolution is represented by $X=UV^T$.

Figure 4B:
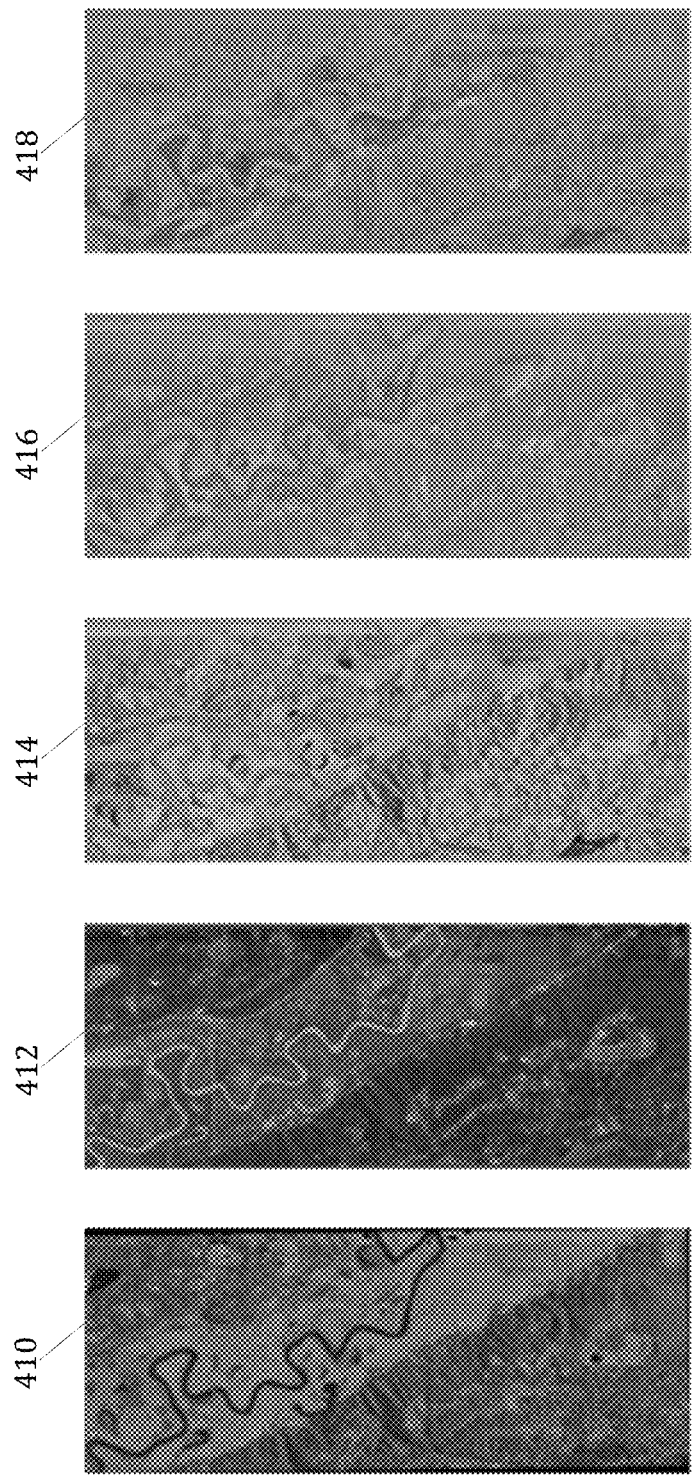
FIG. 4B depicts example land structure features.

FIG. 4B depicts example land structure features 410-418. The first land structure feature image 410 corresponds to the first or top-level singular vector from the decomposition. The second land structure feature image 412 corresponds to the second level singular vector from the decomposition. The third land structure feature image 414 corresponds to the third level singular vector from the decomposition. The fourth land structure feature image 416 corresponds to the fourth level singular vector from the decomposition. The fifth land structure feature image 418 corresponds to the fourth level singular vector from the decomposition. As can be seen from the images 410-418, different land features, such as the river, become more apparent depending on the corresponding singular vector. Multiple land structure feature images 410-418 may be used in the other processes described herein. For example, four of the land structure feature images 410-416 may be used as the high-resolution land structure features. The number of land structure features image 410-418 that are utilized may depend on the number of channels for the desired high-resolution images. For example, the Airbus Pleiades high-resolution images utilize four channels, and therefore in such examples, four land structure feature images 410-416 may be utilized. The land structure feature images 410-418 may be referred to as singular-vector images.

Figure 5:
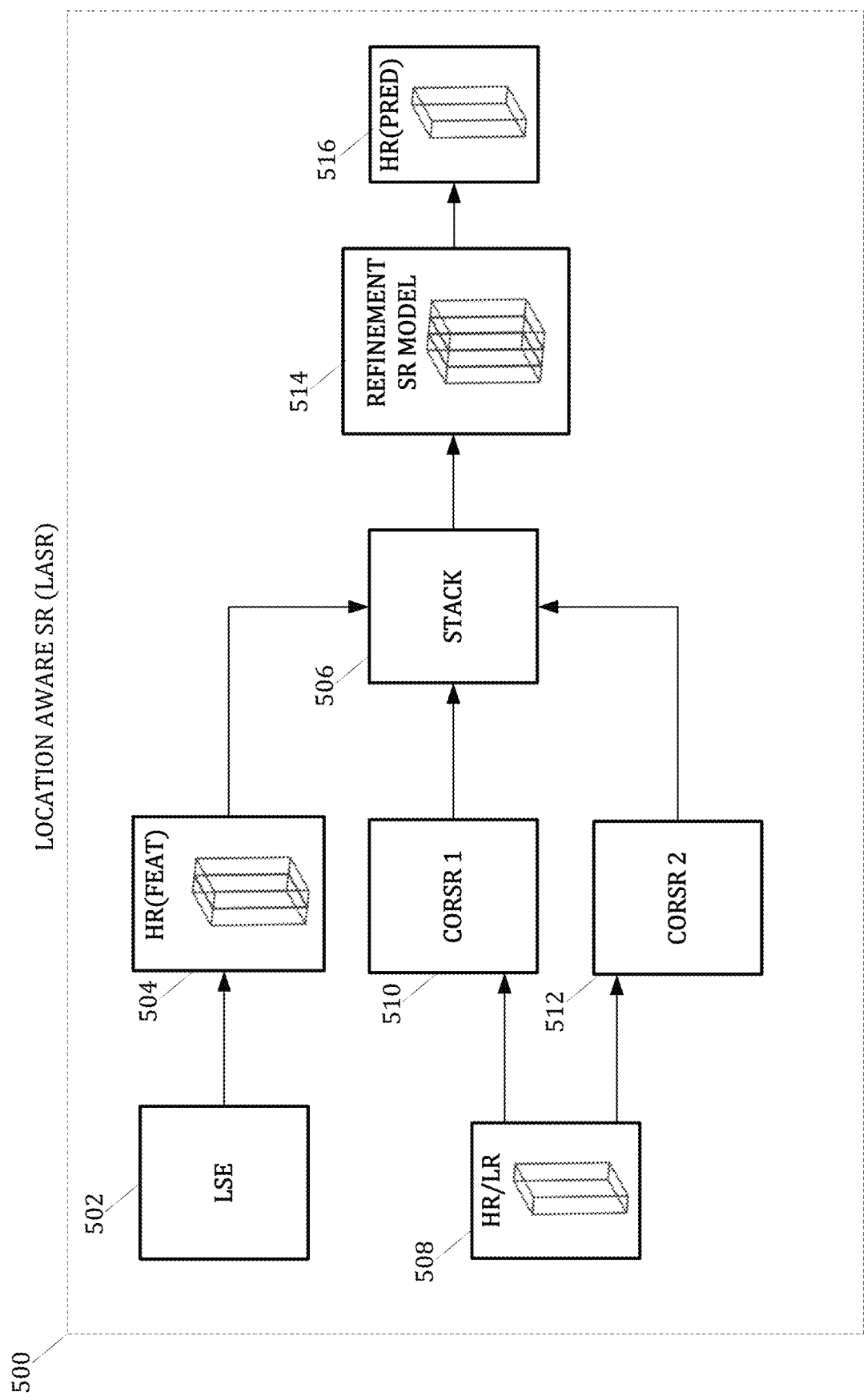
FIG. 5 depicts a block diagram for an example location aware SR (LASR) process.

FIG. 5 depicts a block diagram for an example location aware SR (LASR) process 500. The LASR process 500 incorporates and combines the processes described above to improve the ultimate quality of the predicted high-quality image. The LASR process 500 may include performing an LSE process 502 to produce high-resolution land structure features 504. The LSE process 502 may be the LSE process 400 described above with respect to FIGS. 4A-4B.

The LASR process may also include performing two or more different CoRSR processes, such as the CoRSR process 300 described above in FIG. 3. For instance, an augmented input 508 similar to the augmented input 306 in FIG. 3 may be generated. The augmented input 508 includes a transformed low-resolution image and a past high-resolution image and/or high-resolution land-structure features. A first CoRSR process 510 is processed on the input 508 using a first SR model or technique. For instance, the first CoRSR process 510 may utilize an SRCNN. The first CoRSR process 510 generates a first predicted high-resolution image. A second CoRSR process 512 is processed on the augmented input 508 using a second SR model or technique. For instance, the second CoRSR process 512 may utilize the RRDB technique. The second CoRSR process 512 generates a second predicted high-resolution image.

Using multiple CoRSR algorithms allows for capturing the benefits from different types of SR models or techniques. For example, use of an SRCNN technique generally produces a low error but does not perform as well in generating high-resolution or high-fidelity reconstruction data. RRDB, however, is good at generating high-fidelity or high-resolution data but may have a higher error, such as a mean squared error (MSE).

The outputs from the LSE process 502, the first CoRSR process 510, and the second CoRSR process 512 may then be combined or stacked together in a stacking process 506. For instance, the high-resolution land structure features 504 may be combined with the first predicted high-resolution image from the first CoRSR process 510 and the second predicted high-resolution image from the second CoRSR process 512. Stacking or combining the data may include generating a multi-channel image or image data where the number of channels is equal to the product of the number input images being combined and the number of channels in each input image. For example, the predicted high-resolution images may have four channels corresponding to red, green, blue, and infrared. Those four channels are the channels of an example high-resolution image from the Airbus Pleiades satellite system. The high-resolution land structure features 504 may also be formatted to include those four channels. Accordingly, the combination of the high-resolution land structure features 504, the first predicted high-resolution image, and the second predicted high-resolution image may result in a stacked image with 12 channels.

The stacked image from the stacking operation 506 is provided as input into a refinement SR model 514. The refinement SR model 514 process the stacked image to generate a final predicted high-resolution image 516. The refinement SR model 514 may a type of SR model or technique discussed above, such as the SRCNN, RRDB, and ESRGAN, among others. The refined SR model may also be trained using actual high-resolution images, such as the Airbus Pleiades satellite images discussed above. As an example, for a stacked image based on low-resolution images of a particular geographic location captured on a particular date, a high-resolution image of that geographic location on or near that particular date may be used as the desired output or ground truth for training the refinement SR model 514.

The final predicted high-resolution image 516 may be a four-channel image or an image having the same number of channels as the high-resolution images used to train the refinement SR model. For example, the final predicted high-resolution image 516 may have the same number and type of channels as the predicted high-resolution image from either the first CoRSR process 510 or the second CoRSR process 512.

By stacking the images from the LSE and CoRSR processes and performing the refinement SR process on the stacked image, the final predicted high-resolution image becomes more accurate than the images produced from any one of the LSE or CoRSR processes. Table 2 below shows indications of example accuracy metrics for the respective processes.

TABLE 2

| Metric | CoRSR (SRCNN) | CoRSR (RRDB) | LSE | LASR |
|---|---|---|---|---|
| SSIM | 0.7800 | 0.7867 | 0.8358 | 0.90 |
| MSE | 0.0041 | 0.0043 | 0.0081 | 0.0036 |

Table 2 includes columns for a CoRSR process performed with an SRCNN, a CoRSR process performed with an RRDB, an LSE process, and the LASR process. Metrics are then provided for the respective predicted images produced by each of the processes. The first metric is the structural similarity index measure (SSIM). A score of 1.0 would indicate a perfect structural similarity. The second metric is a mean squared error (MSE). An MSE of zero (i.e., no error) would be ideal. As can be seen from Table 2, the LASR process provides improvements to both SSIM and MSE metrics as compared to any one of the processes.

The LASR process that combines LSE processes and CoRSR process also provides benefits over using a single large or very deep (e.g., many layer) neural network. A very deep neural network requires significant training data and time to train the neural network. In contrast, the LSE, CoRSR, and LASR processes utilize smaller models that can be trained more quickly and based on less data. Further, each of the smaller models may be adjusted individually to more finely tune and control the overall process, which can provide better insight than provided by a single very deep neural network.

Figure 6A:
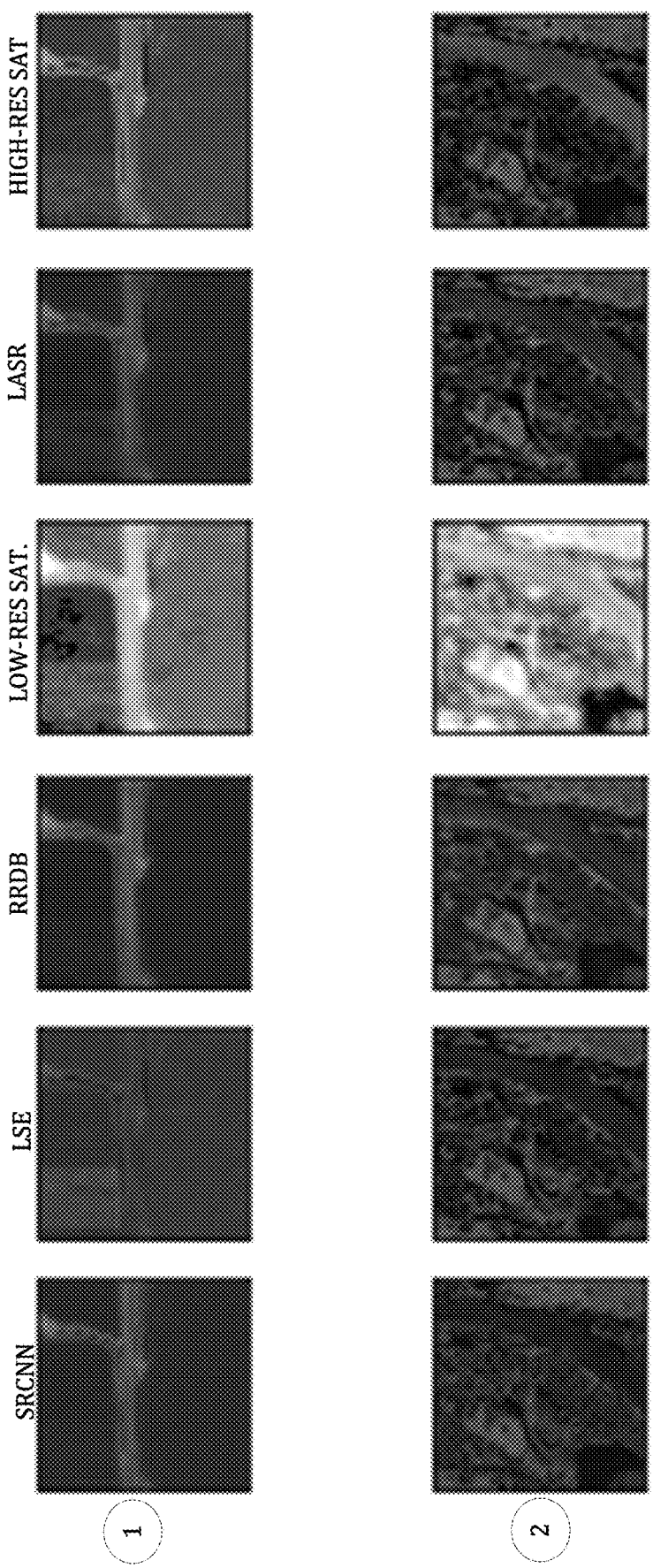
FIG. 6A depicts example predicted high-resolution images for two different locations.

FIG. 6A depicts example predicted high-resolution images for two different locations. The first row depicts images for a first geographical location on a particular date, and the second row depicts images for a second geographical location on a particular date. The first image in each row is the predicted high-resolution image produced from a CoRSR process using an SRCNN. The second image is a predicted high-resolution image using LSE techniques. The third image is a predicted high-resolution image produced from a CoRSR process using an RRDB model. The fourth image is a low-resolution satellite image, such as an image from the Sentinel-2 satellite system. The fifth image is the final predicted high-resolution from the LASR process. The sixth and last image is an actual high-resolution image of the location on the particular date, which may be a high-resolution image from the Airbus Pleiades satellite system. As can be seen from the images, the final predicted high-resolution image from the LASR process is quite close to the actual high-resolution image, and the final predicted high-resolution image is certainly much closer to the actual high-resolution image than the low-resolution satellite image. The other predicted high-resolution images from the CoRSR and LSE processes are also significantly closer to the actual high-resolution image than the low-resolution satellite image.

Figure 6B:
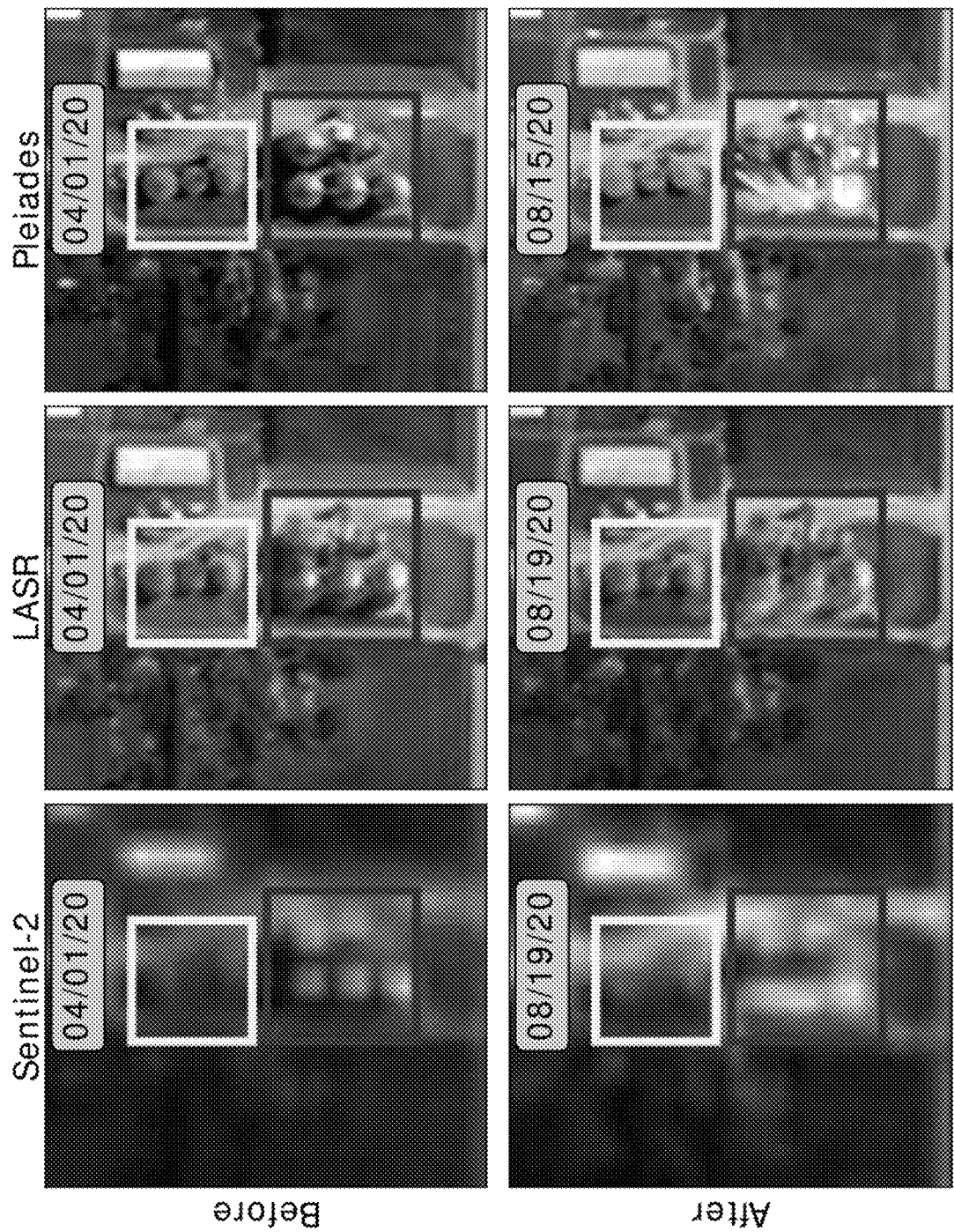
FIG. 6B depicts example images from before and after a disaster.
Figure 7:
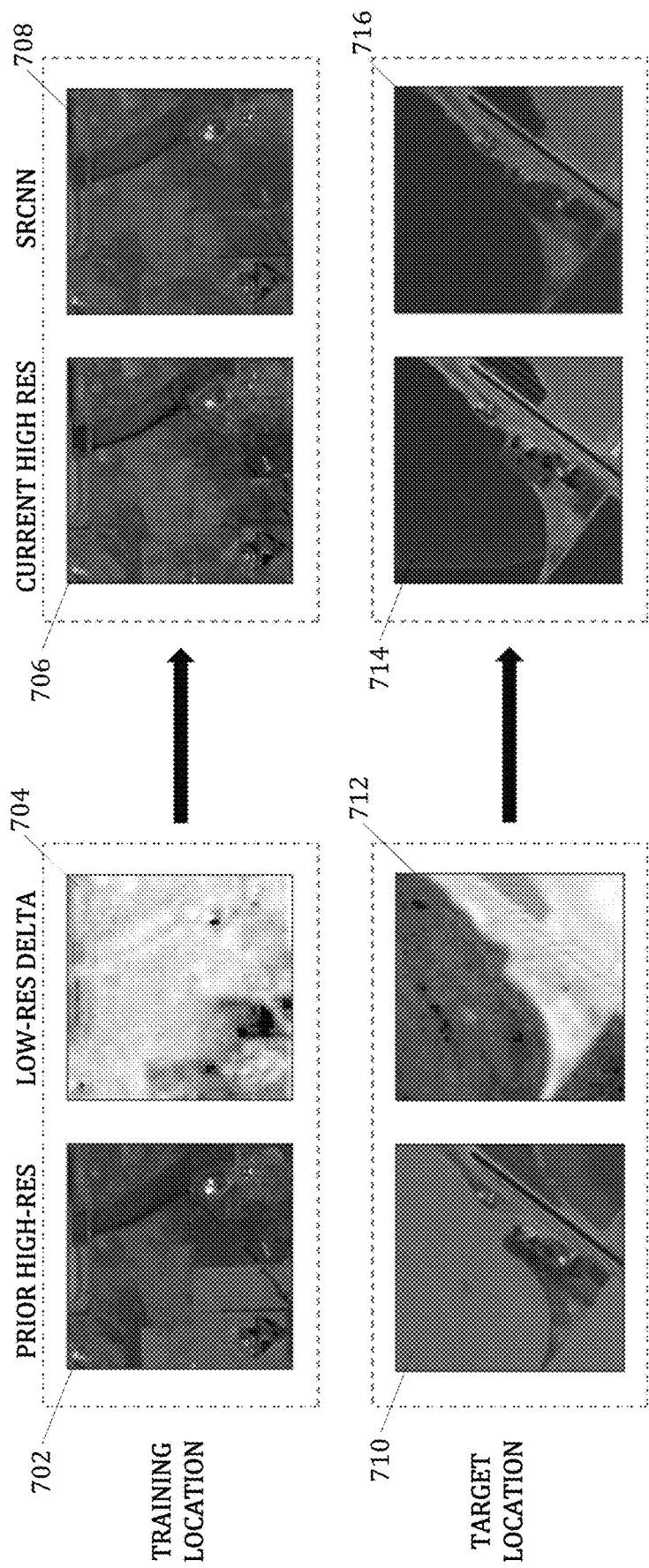
FIG. 7 depicts example predicted high-resolution images for different training and testing locations.

FIG. 6B depicts images before and after a disaster. The first row of images includes a Sentinel-2 image, a LASR predicted high-resolution image, and a Pleiades image of grain silos in Luther, Iowa before a storm. The second row of images includes a Sentinel-2 image, a LASR predicted high-resolution image, and a Pleiades image of the grain silos after the storm. As can be seen, the LASR predicted high-resolution image generated after the storm has a high enough resolution to discern that the grain silos have been damaged. Accordingly, the present technology is able to generate useful images from more readily available low-resolution images. In the example depicted, the present technology may be used for assessing widespread damage. Such an assessment may be useful in insurance investigations or other investigations where such assessments would be beneficial, FIG. 7 depicts example predicted high-resolution images for different training and target locations. The processes described herein for generating predicted high-resolution images from low-resolution images are applicable to geographic locations that were not part of the training data for the machine learning and/or SR models described herein. For example, the machine learning and/or SR models may be trained on training data from some geographic locations around the planet but most likely less than the entire planet. Live or current low-resolution data for new locations may be used by the models and processes to predict high-resolution images for those locations even though those locations were not included in the training data.

The first row of images represents images of a first geographic location. More specifically, a prior high-resolution image 702 and a low-resolution delta image 704 for the first geographic location are depicted. Images for the first geographic location were also used in training the machine learning and/or SR models used in the respective CoRSR process. The prior high-resolution image 702 and the low-resolution delta image 704 were used as input for a CoRSR process utilizing an SRCNN model. The predicted high-resolution image 708 produced by that process is depicted as well as an actual high-resolution image 706. As can be seen, the predicted high-resolution image 708 is quite similar to the actual high-resolution image 706 even though the low-resolution image was occluded by clouds.

The second row of images represents images of a second geographic location. In this example, no images of the second geographic location were used in training the machine learning and/or SR models in the CoRSR process. Despite that fact, the predicted high-resolution image 716 is still strikingly similar to the actual high-resolution image 714. More specifically, a prior high-resolution image 710 and a low-resolution delta image 712 were used as input to the CoRSR process with the SRCNN model to generate the predicted high-resolution image 716. As can be seen from the images, the prior high-resolution image 710 shows a portion of a field that, at the time the high-resolution image 710 was captured, was brown. Using a current low-resolution delta image 712 allowed for the generation of a predicted high-resolution image 716 that shows the field had turned green. The actual high-resolution image 714 confirmed that the field had in fact turned green.

Figure 8A:
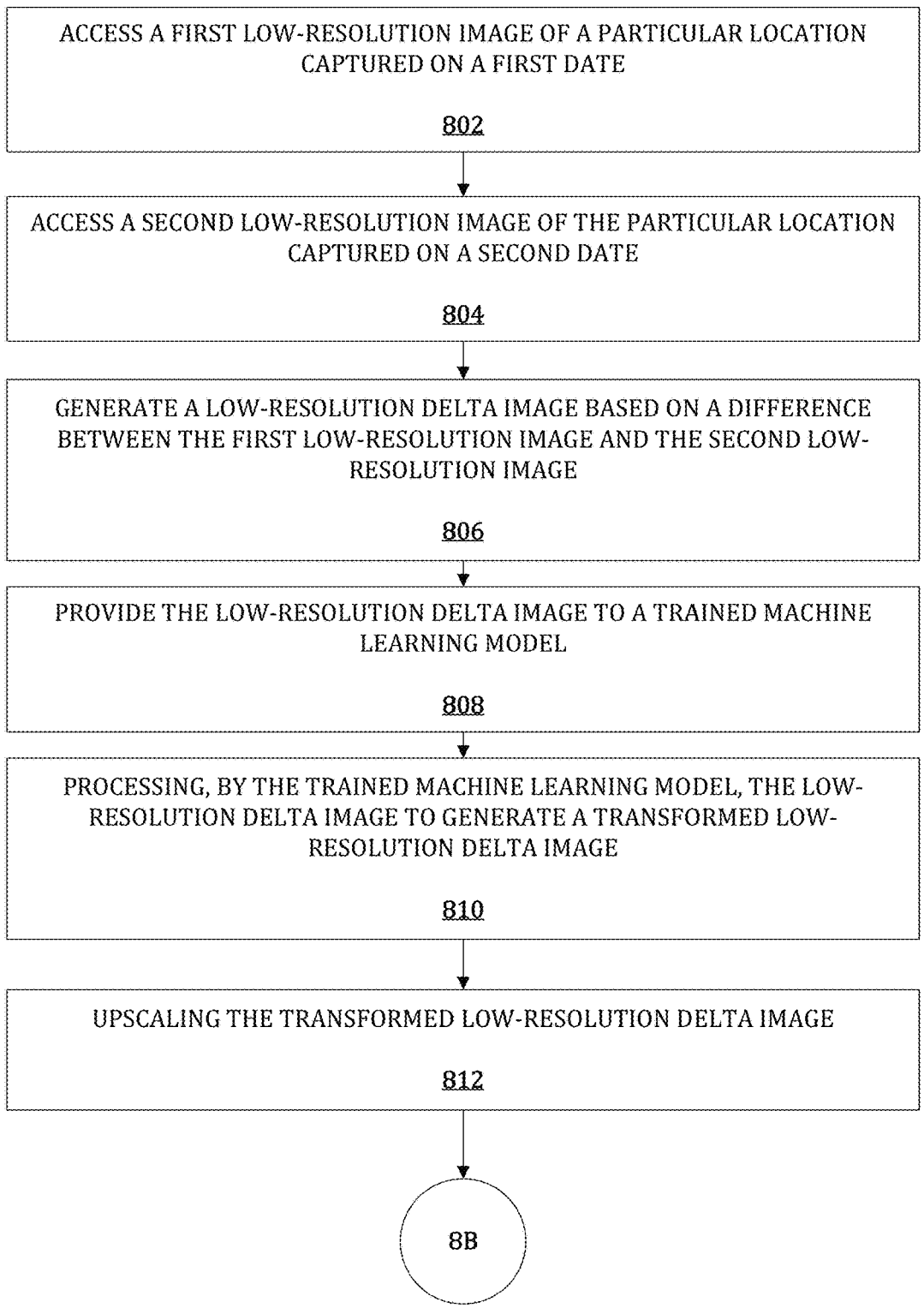
FIGS. 8A-8C depicts an example method for generating a predicted high-resolution image for a location.
Figure 8B:
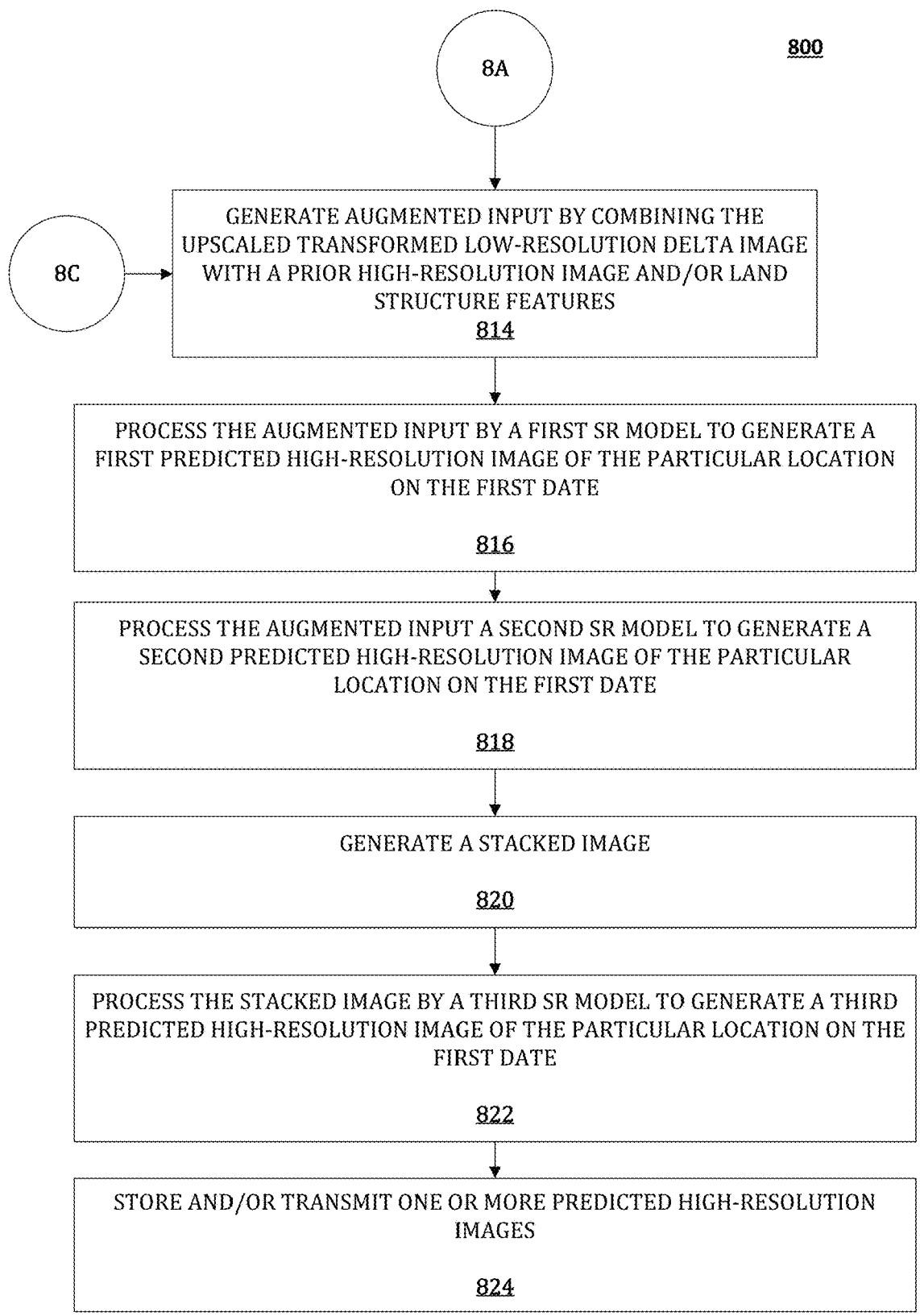
Figure 8C:
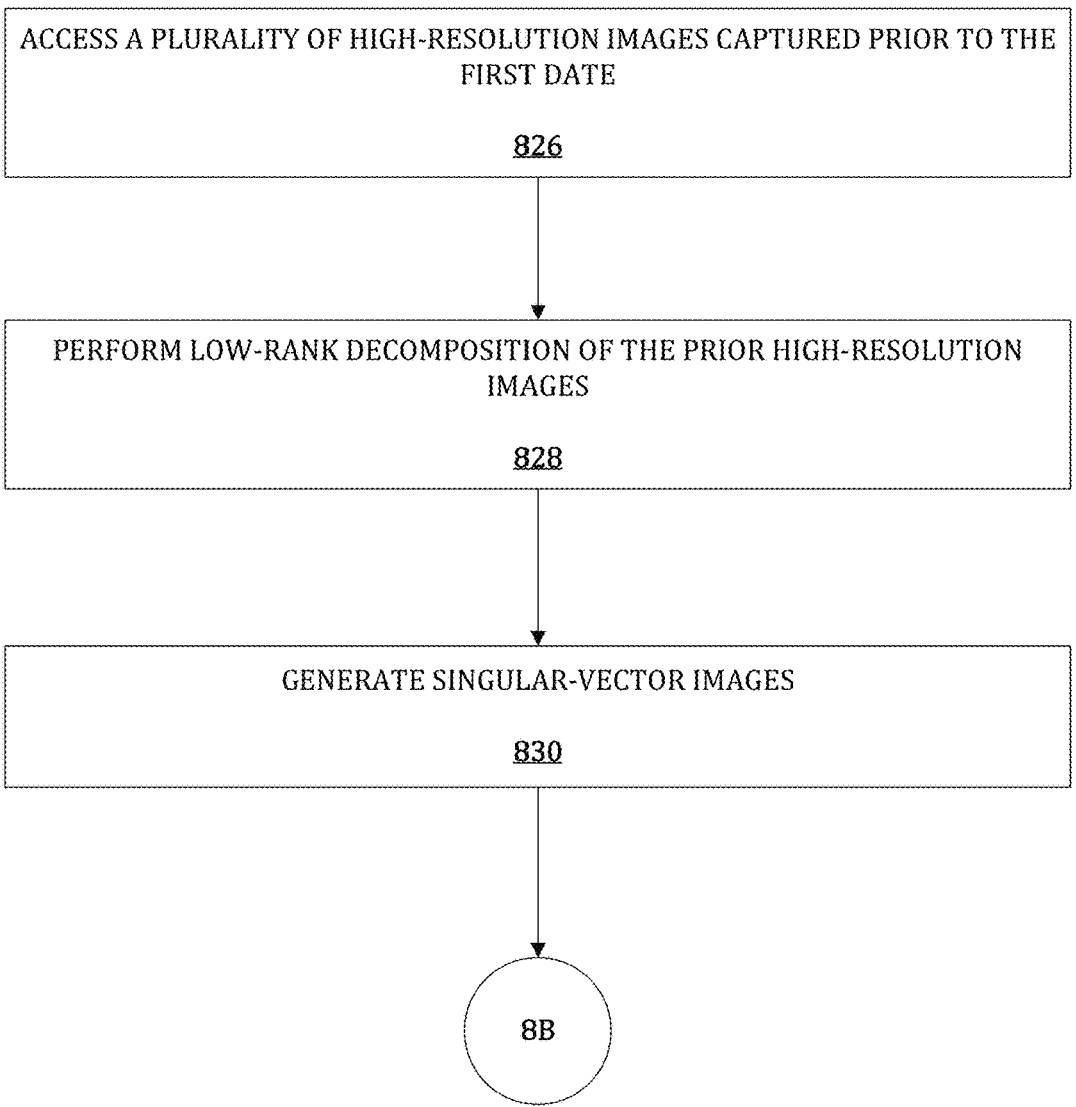

FIGS. 8A-8C depict an example method 800 for generating a predicted high-resolution image for a particular location at a time where an actual high-resolution image may be unavailable. At operation 802, a first low-resolution image of a particular location is accessed or received. The first low-resolution image is captured on a first date. The first date may be the desired date for which a predicted high-resolution image for the particular location is to be generated. The first low-resolution image may have first sensor characteristics based on a first sensor used to capture the low-resolution image. For instance, as discussed above, different image capture devices, such as satellites, have different sensors that generate images having different spectrums or channels. The sensor characteristics may represent the color channels or other spectrum information about the image that may be based on the type of sensor used to capture the image.

At operation 804, a second low-resolution image of the particular location is accessed or received. The second low-resolution image is captured on a second date. The second date may be prior to the first date. The second date may correspond to the most-recent high-resolution image available for the particular location. For example, for the particular location, a query may be executed to find the most-recent high-resolution image available. The date of that high-resolution image may then be used as the second date. The second low-resolution image is then a low-resolution image that was captured closest to the second date.

At operation 806, a low-resolution delta image may be generated based on a difference between the first low-resolution image and the second low-resolution image. For instance, the second low-resolution image may be subtracted from the fist low-resolution image to form the low-resolution delta image.

At operation 808, the low-resolution delta image is provided to a trained machine learning model. The trained machine learning model is a machine learning model that has been trained based on down sampled prior high-resolution images. The prior high-resolution images are high-resolution images that were captured prior to the first date. The prior high-resolution images have second sensor characteristics based on a second sensor used to capture the prior high-resolution images. For instance, the image capture device used to capture the high-resolution images may have a different sensor than the image capture device used to capture the low-resolution images. As a result, the high-resolution images have different spectrums and/or channels (e.g., different sensor characteristics) than the low-resolution images. The trained machine learning model is able to transform the low-resolution images having first sensor characteristics into low-resolution images having the second sensor characteristics.

At operation 810, the trained machine learning model processes the low-resolution delta image to generate a transformed low-resolution delta image. The transformed low-resolution image has the second sensor characteristics that are shared by the high-resolution images used to train the trained machine learning model. At operation 812, the transformed low-resolution delta image may be upscaled to match the resolution of a high-resolution image.

At operation 814, an augmented input is generated. The augmented input is generated by combining the upscaled transformed low-resolution delta image with at least one of: (1) a target high-resolution image of the particular location, which may be a prior high-resolution image; and/or (2) land structure features for the particular location. The prior high-resolution image may be a high-resolution image captured on the second date. Generation of the land structure features may be performed using an LSE process discussed above. Operations 826-830, depicted in FIG. 8C, describe some example operations for generating land structure features.

At operation 826, a plurality of high-resolution images captured prior to the first date are accessed. The plurality of prior high-resolution images may be combined or represented in a matrix, such as the matrix (X) discussed above. At operation 828, a low-rank decomposition of the prior high-resolution images is performed. At operation 830, the low-rank decomposition may generate a plurality of singular vector images, such as the singular vector images shown in FIG. 4B and described above. One or more of those singular vector images may be used as the land structure features in the augmented input generated in operation 814. Prior high-resolution images or a high-resolution estimate from the LSE process may also, or alternatively, be used in the augmented input.

Returning to FIG. 8B, at operation 816, the augmented input generated in operation 814 is processed by a first SR model. The first SR model may have an SR model type, such as a super resolution convolutional neural network (SRCNN) model, Residual-in-Residual Dense Block (RRDB) model, a Super-Resolution Generative Adversarial Network (SRGAN) model, and an Enhanced SRGAN (ESR-GAN) model. Processing the augmented input by the first SR model generates a first predicted high-resolution image of the particular location on the first date.

At operation 818, the augmented input is processed by a second SR model to generate a second predicted high-resolution image of the particular location on the first date. The second SR model may have a different SR model type than the first SR model. For example, first SR model may be an SRCNN model, and the second SR model may be an RRDB model. Thus, the first predicted high-resolution image may be different than the second predicted high-resolution image.

At operation 820, a stacked image may be generated. The stacked image may be generated by combining the first predicted high-resolution image and the second predicted high-resolution images. The stacked image may have a number of channels based on the channels of the input images. For instance, in an example where the first predicted high-resolution image and the second predicted high-resolution image each have four channels, a stacked image formed of those two predicted images may have eight channels. The stacked image may also be formed by adding or combining the land structure features with one or both of the first and second predicted high-resolution images.

At operation 822, the stacked image is processed by a third SR model to generate a third predicted high-resolution image of the particular location on the first date. The third SR model be of any model type. The third predicted high-resolution image may be the final predicted high-resolution image 516 depicted in FIG. 5 and discussed above. The third-predicted high-resolution image may be more accurate than either or both of the first predicted high-resolution image and the second predicted high-resolution image. For instance, the third predicted high-resolution image may have a structural similarity index measure (SSIM) value that is greater than an SSIM value of the first predicted high-resolution image and an SSIM value of the second predicted high-resolution image. In some examples, the SSIM value for the third predicted high-resolution image is greater than or equal to 0.90.

At operation 824, one or more of the predicted high-resolution images are stored, transmitted, displayed, or further processed. For example, the third predicted high-resolution image may be transmitted to one or more client devices for display or processing of the image. Current high-resolution images may have many uses and applications, including managing or monitoring agricultural growth and development, forest management, or any other application where detailed images may be beneficial.

The images discussed herein are primarily described as images of a geographic locations that are captured via a satellite or other aerial device. The present technology, however, may be applied to other types of images as well. As one example, the present technology may be applied in medical imaging applications where low-resolution and high-resolution images are captured and used. The low-resolution images may be captured more frequently than the high-resolution images. Accordingly, the present technology allows for the low-resolution images to be used to predict high-resolution images, which increases the frequency that high-resolution imagery is available for use. In the medical imaging example, the land structure features described herein may be anatomical features or landmarks of the human body. Medical imaging is just one example of where the present technology may be applied. For instance, the present technology may be useful in any scenario where low-resolution images of an object or location are captured more frequently than high-resolution images.

Figure 9:
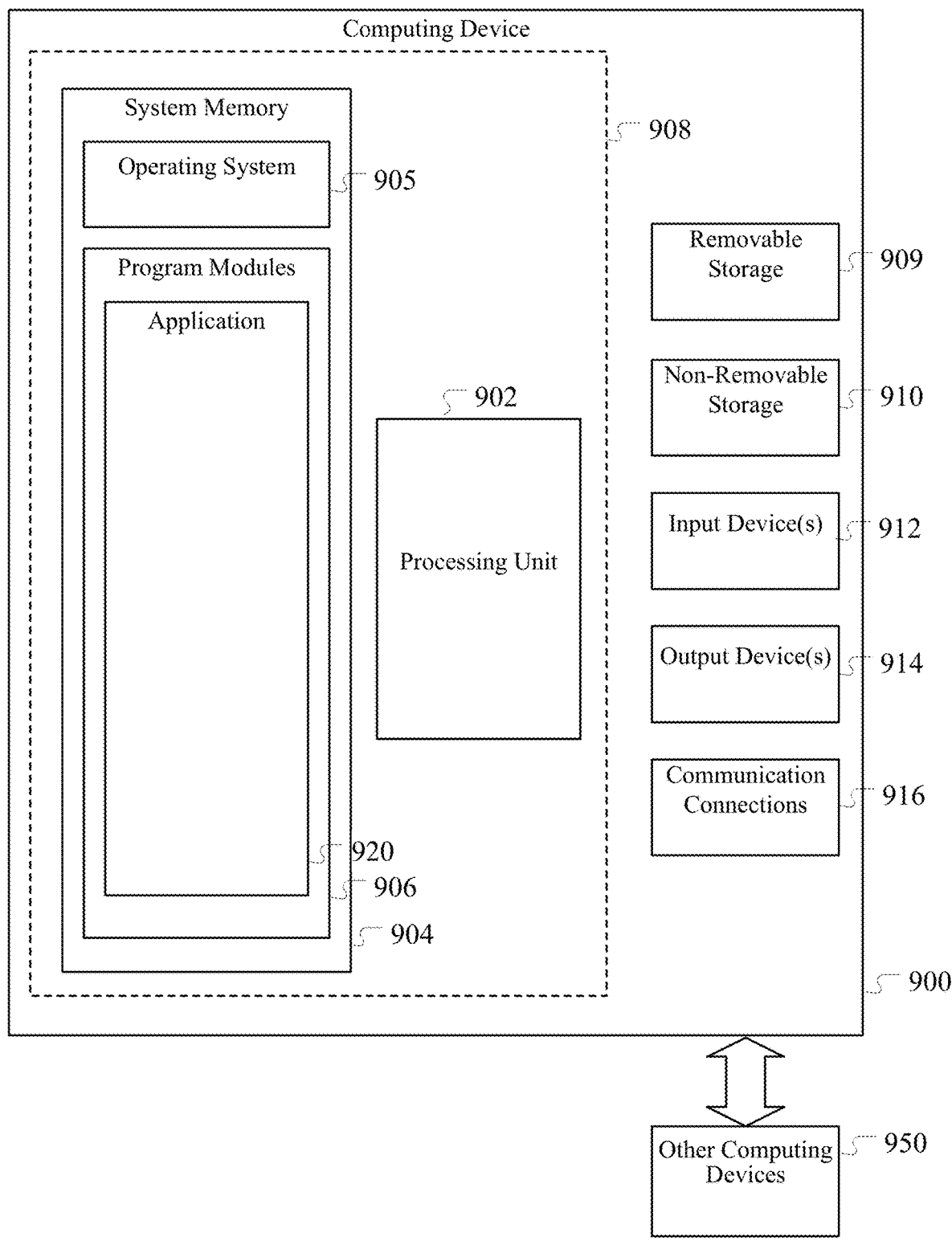
FIG. 9 is a block diagram illustrating example physical components of a computing device with which aspects of the disclosure may be practiced.
Figure 10A:
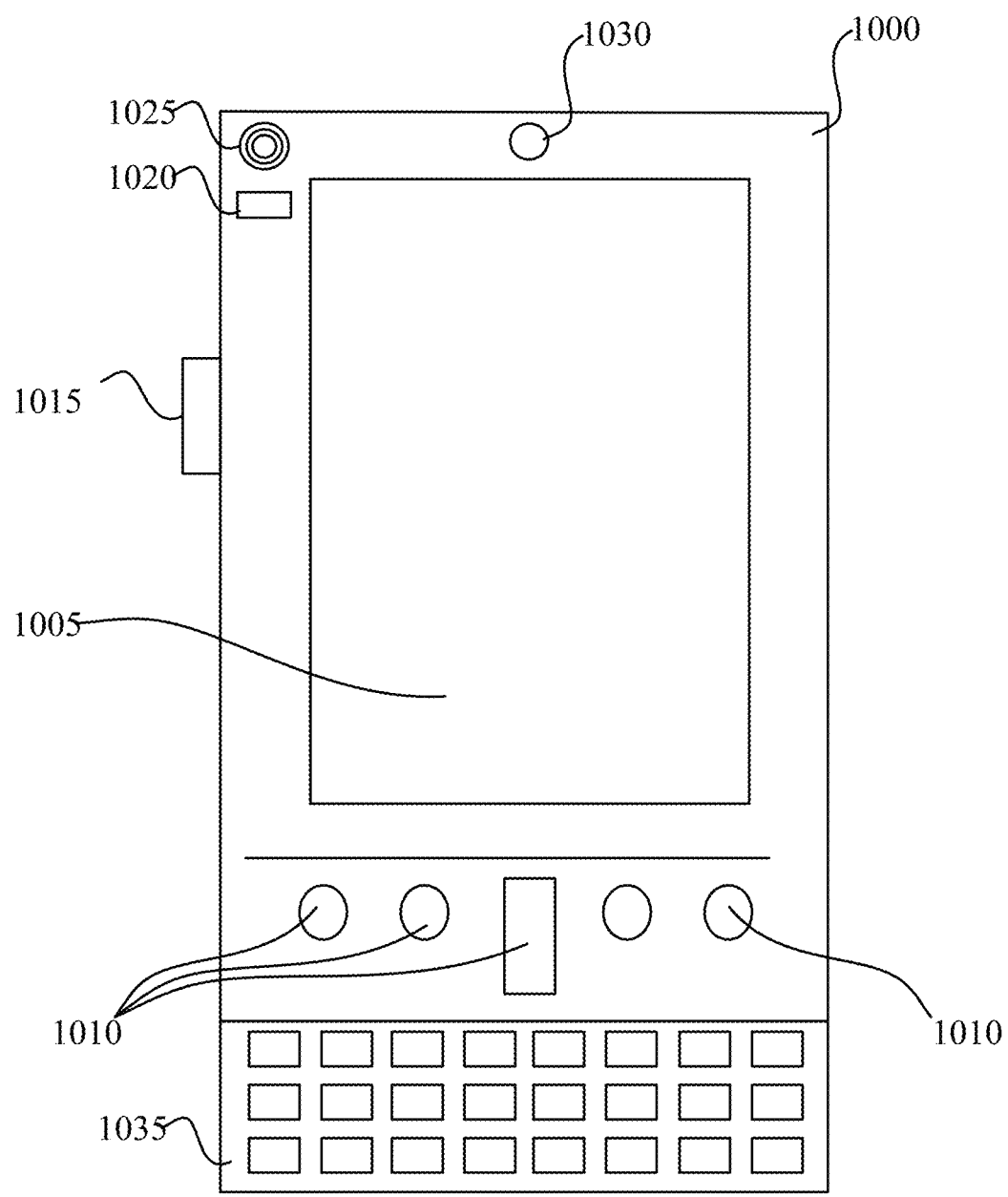
FIGS. 10A and 10B are simplified block diagrams of a mobile computing device with which aspects of the present disclosure may be practiced.
Figure 10B:
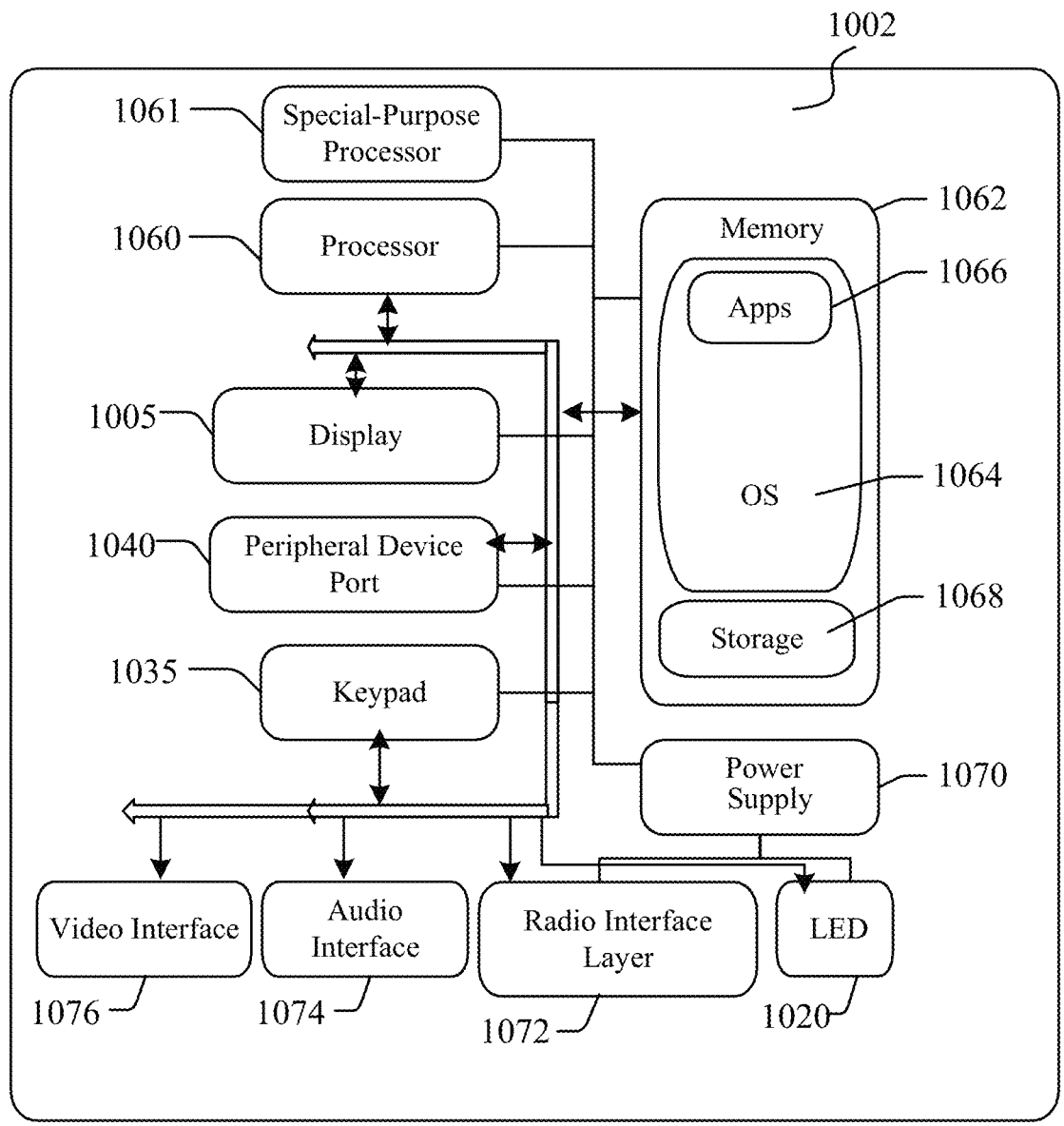

FIGS. 9, 10A, 10B and the associated descriptions provide a discussion of a variety of operating environments in which aspects of the disclosure may be practiced. However, the devices and systems illustrated and discussed with respect to FIGS. 9, 10A, and 10B are for purposes of example and illustration and are not limiting of a vast number of computing device configurations that may be utilized for practicing aspects of the disclosure, described herein.

FIG. 9 is a block diagram illustrating physical components (e.g., hardware) of a computing device 900 with which aspects of the disclosure may be practiced. For example, the computing device 900 may illustrate components of a server, such as the image processing server 114 described above with respect to FIG. 1. The computing device components described below may be suitable for the computing devices and systems described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more virtual machines and/or one or more components supported by the systems described herein. The operating system 905, for example, may be suitable for controlling the operation of the computing device 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, solid-state drives, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include virtual machines, hypervisors, and other types of applications such as electronic mail and contacts applications, word processing applications, spreadsheet applications, database applications, slide presentation applications, drawing or computer-aided application programs, etc.

Furthermore, embodiments, or portions of embodiments, of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As previously discussed, the aspects and functionalities described herein may operate over distributed systems (e.g., system 100 in FIG. 1), where application functionality, memory, data storage and retrieval and various processing functions may be operated remotely from each other over a distributed computing network, such as the Internet or an intranet. Resultantly, clients or other users, for example, may utilize associated computing devices to interact with the system 100. User interfaces and information of various types may be displayed via on-board computing device displays or via remote display units associated with such computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 8A and 8B below include an example computing device associated with a client (e.g., a computing device associated with a user), for example, that may be utilized to execute a locally installed application associated with the system 100 or run a web browser through which a web application associated with the system 100 is accessible to send, receive, display, and/or process predicted high-resolution images.

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

If included, a side input element 1015 allows additional user input. The side input element 1015 may be a rotary switch, a button, or any other type of manual input element. Additionally, if included, an on-board camera 1030 allows further user input in the form of image data captured using the camera 1030. In alternative aspects, mobile computing device 1000 may incorporate more or less input elements. For example, the display 1005 may not be a touch screen in some embodiments.

In yet another alternative embodiment, the mobile computing device 1000 is a portable phone system, such as a cellular phone. The mobile computing device 1000 may also include a keypad 1035. The keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device (e.g., a peripheral device). These input and/or output ports are also referred to as peripheral device ports 1040 as illustrated in FIG. 10B.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs 1066 include phone dialer programs, e-mail programs, personal information management (PIM) programs, word processing programs, spreadsheet programs, Internet browser programs, messaging programs, and so forth. In an aspect, the application programs 1066 may also include an application associated with the system 106. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 described with reference to FIG. 10A may be used to provide visual notifications, and/or an audio interface 1074 may be used for producing audible notifications via the audio transducer 1025 described with reference to FIG. 10A. These devices may be directly coupled to the power supply 1070 so that when activated, they remain on for a duration dictated by the notification mechanism even though the processor(s) (e.g., processor 1060 and/or special-purpose processor 1061) and other components might shut down for conserving battery power. The visual indicator 1020 may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 6B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a computing device in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Based on the foregoing, various aspects should be appreciated, including at least the following. In an aspect, the technology relates to a computer-implemented method for generating an image. The method includes accessing a low-resolution image of a particular location captured on a first date, wherein the low-resolution image has first sensor characteristics based on a first sensor used to capture the low-resolution image; providing the low-resolution image to a trained machine learning model, wherein the trained machine learning model was trained based on down sampled prior high-resolution images, wherein the prior high-resolution images were captured prior to the first date and the prior high-resolution images have second sensor characteristics based on a second sensor used to capture the prior high-resolution images; and processing, by the trained machine learning model, the low-resolution image to generate a transformed low-resolution image, wherein the transformed low-resolution image has the second sensor characteristics.

In an example, the low-resolution image is an image from a first satellite system, the high-resolution images are images from a second satellite system, and the particular location is a geographic location. In another example, the prior high-resolution images are of a location other than the particular location of the low-resolution image. In yet another example, the method further includes generating an augmented input for a first super resolution model by combining the transformed low-resolution image with at least one of: a target high-resolution image for the particular location captured on a second date, the second date being prior to the first date; land structure features for the particular location; or external land data. In the example, the method includes providing the augmented input to the first super resolution model; and processing, by the first super resolution model, the augmented input to generate a first predicted high-resolution image for the particular location on the first date. In a further example, the super resolution model is one of a super resolution convolutional neural network (SRCNN) model, Residual-in-Residual Dense Block (RRDB) model, a Super-Resolution Generative Adversarial Network (SRGAN) model, and an Enhanced SRGAN (ESRGAN) model.

In still another example, the transformed low-resolution image is combined with the land structure features, and the method further comprises generating the land structure features by a performing a low-rank decomposition on at least one prior high-resolution image for the particular location. In still yet another example, performing the low-rank decomposition results in a plurality of singular-vector images of the particular location corresponding to different eigenvectors of the low-rank decomposition, wherein at least one of the singular-vector images is used as the land structure features.

In another example, the low-resolution image is a low-resolution delta image, wherein the low-resolution delta image represents a different between a first low-resolution image captured on the first date and a second low-resolution image captured on the second date. In a further example, the method further includes generating a stacked image by combining the first predicted high-resolution image with a second predicted high-resolution image of the particular location on the first date; and processing, by a second super resolution model, the stacked image to generate a third predicted high-resolution image of the particular location on the first date. In yet another example, the third predicted high-resolution image has a structural similarity index measure (SSIM) value that is greater than an SSIM value of the first predicted high-resolution image and an SSIM value of the second predicted high-resolution image. In still another example, the SSIM value for the third predicted high-resolution image is greater than or equal to 0.90. In still yet another example, the stacked image further includes the land structure features combined with the first predicted high-resolution image and the second predicted high-resolution image.

In another aspect, the technology relates to a system for generating a high-resolution image from a low-resolution image. The system includes at least one processor; and memory storing instructions that, when executed by the at least one processor, cause the system to perform operations. The operations include generating an augmented input for a first super resolution model by combining a transformed low-resolution image of a particular location, captured on a first date, with at least one of: a target high-resolution image for the particular location captured on a second date, the second date being prior to the first date; land structure features for the particular location; or external land data. The operations further include processing, by the first super resolution model, the augmented input to generate a first predicted high-resolution image for the particular location on the first date.

In an example, the transformed low-resolution image is combined with the land structure features, and the operations further comprise generating the land structure features by a performing a low-rank decomposition on at least one prior high-resolution image for the particular location. In another example, the operations further include accessing a low-resolution image of the particular location captured on the first date, wherein the low-resolution image has first sensor characteristics based on a first sensor used to capture the low-resolution image; providing the low-resolution image to a trained machine learning model, wherein the trained machine learning model was trained based on down sampled prior high-resolution images, wherein the prior high-resolution images were captured prior to the first date and the prior high-resolution images have second sensor characteristics based on a second sensor used to capture the prior high-resolution images; and processing, by the trained machine learning model, the low-resolution image to generate the transformed low-resolution image, wherein the transformed low-resolution image has the second sensor characteristics. In a further example, the operations further include generating a stacked image by combining the first predicted high-resolution image with a second predicted high-resolution image of the particular location on the first date; and processing, by a second super resolution model, the stacked image to generate a third predicted high-resolution image of the particular location on the first date.

In another aspect, the technology relates to a method for generating an image. The method includes accessing a plurality of high-resolution images, captured prior to a first date, or a particular location; generating land structure features for the particular location by performing a low-rank decomposition on the plurality of high-resolution images; and based on the land structure features and a low-resolution image captured on the first date, generating a first predicted high-resolution image for the particular location on the first date.

In an example, performing the low-rank decomposition results in a plurality of singular-vector images of the particular location corresponding to different singular vectors of the low-rank decomposition, wherein at least one of the singular-vector images is used as the land structure features. In another example, the method further includes combining the land structure features with the low-resolution image to form an augmented input for a first super-resolution model; and processing, by the first super resolution model, the augmented input to generate the first predicted high-resolution image. In still another example, the method further includes generating a stacked image by combining the first predicted high-resolution image with a second predicted high-resolution image of the particular location on the first date; and processing, by a second super resolution model, the stacked image to generate a third predicted high-resolution image of the particular location on the first date.

As used herein, the term "high-resolution" indicates a resolution that is higher than the resolution of the "low-resolution" images. Similarly, the term "low-resolution" indicates a resolution that is lower than the resolution of the "high-resolution" images. In some examples, the high-resolution images may have a resolution that is at least double the resolution of the low-resolution images.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method, comprising:
accessing a first image of a particular location captured on a date, wherein the first image has a first resolution based on first sensor characteristics of a first sensor used to capture the first image;
providing the first image to a machine learning model, wherein;
the machine learning model is trained based on second images;
the second images have a second resolution that is higher than the first resolution;
the second images were captured prior to the date; and
the second resolution is based on second sensor characteristics of a second sensor used to capture the second images;
extracting land structure features from at least one of the second images or an external source for the particular location; and
processing, by the machine learning model and based on the land structure features, the first image to generate a third image that shares the second sensor characteristics.

2. The method of claim 1, wherein the first image is an image from a first satellite system, the second images are images from a second satellite system, and the particular location is a geographic location.

3. The method of claim 1, wherein the second images are of a location other than the particular location of the first image.

4. The method of claim 1, further comprising:
generating an augmented input for a super resolution model by combining the third image with at least one of:
a target second image for the particular location captured on a another date, the other date being prior to the date;
the land structure features; or
external land data;
providing the augmented input to the super resolution model; and
processing, by the super resolution model, the augmented input to generate the third image.

5. The method of claim 4, wherein the super resolution model is one of a super resolution convolutional neural network (SRCNN) model, Residual-in-Residual Dense Block (RRDB) model, a Super-Resolution Generative Adversarial Network (SRGAN) model, and an Enhanced SRGAN (ESRGAN) model.

6. The method of claim 4, wherein the third image is combined with the land structure features, and the method further comprises generating the land structure features by a performing low-rank decomposition on at least one second image for the particular location.

7. The method of claim 6, wherein performing the low-rank decomposition results in a plurality of singular-vector images of the particular location corresponding to different eigenvectors of the low-rank decomposition, wherein at least one of the singular-vector images is used as the land structure features.

8. The method of claim 4, wherein the first image is a low-resolution delta image representing a difference between two images captured on the date and the other date.

9. The method of claim 4, further comprising:
generating a stacked image by combining the third image with a fourth image of the particular location on the date; and
processing, by another super resolution model, the stacked image to generate a fifth image of the particular location on the date.

10. The method of claim 9, wherein the fifth image has a structural similarity index measure (SSIM) value that is greater than an SSIM value of the third image and an SSIM value of the fourth image.

11. The method of claim 10, wherein the SSIM value for the fifth image is greater than or equal to 0.90.

12. A system comprising:
at least one processor, and
memory storing instructions that, when executed by the at least one processor, cause the system to perform operations comprising:
accessing a first image of a particular location captured on a date, wherein the first image has a first resolution based on first sensor characteristics of a first sensor used to capture the first image;
providing the first image to a machine learning model, wherein:
the machine learning model is trained based on second images;
the second images have a second resolution that is higher than the first resolution;
the second images were captured prior to the date; and
the second resolution is based on second sensor characteristics of a second sensor used to capture the second images;
extracting land structure features from at least one of the second images or an external source for the particular location; and
processing, by the machine learning model and based on the land structure features, the first image to generate a third image that shares the second sensor characteristics.

13. The system of claim 12, wherein the operations further comprise:
generating an augmented input for a super resolution model by combining the third image with at least one of:
a target second image for the particular location captured on another date, the other date being prior to the date;
the land structure features; or
external land data;
providing the augmented input to the super resolution model; and
processing, by the super resolution model, the augmented input to generate the third image.

14. The system of claim 13, wherein the third image is combined with the land structure features, and the operations further comprise generating the land structure features by performing a low-rank decomposition on at least one second image for the particular location.

15. The system of claim 13, wherein the operations further comprise:
generating a stacked image by combining the third image with a fourth image of the particular location on the date; and
processing, by another super resolution model, the stacked image to generate a fifth image of the particular location on the date.

16. The system of claim 15, wherein the fifth image has a structural similarity index measure (SSIM) value that is greater than an SSIM value of the third image and an SSIM value of the fourth image.

17. A computer-readable storage medium storing instructions that, when executed by a processor, cause the processor to:
- access a first image of a particular location captured on a date, wherein the first image has a first resolution based on first sensor characteristics of a first sensor used to capture the first image;
- provide the first image to a machine learning model, wherein:
  - the machine learning model is trained based on second images;
  - the second images have a second resolution that is higher than the first resolution;
  - the second images were captured prior to the date; and
  - the second resolution is based on second sensor characteristics of a second sensor used to capture the second images;
- extract land structure features from at least one of the second images or an external source for the particular location; and
- process, by the machine learning model and based on the land structure features, the first image to generate a third image that shares the second sensor characteristics.

18. The computer-readable storage medium of claim 17, wherein the instructions further cause the processor to:
- generate an augmented input for a super resolution model by combining the third image with at least one of:
  - a target second image for the particular location captured on another date, the other date being prior to the date;
  - the land structure features; or
  - external land data;
- provide the augmented input to the super resolution model; and
- process, by the super resolution model, the augmented input to generate the third image.

19. The computer-readable storage medium of claim 18, wherein the third image is combined with the land structure features, and the instructions further cause the processor to generate the land structure features by performing a low-rank decomposition on at least one second image for the particular location.

20. The computer-readable storage medium of claim 18, wherein the instructions further cause the processor to:
- generate a stacked image by combining the third image with a fourth image of the particular location on the date; and
- process, by another super resolution model, the stacked image to generate a fifth image of the particular location on the date.

* * * * *